United States Patent
Mitsunaga et al.

(10) Patent No.: US 9,472,317 B2
(45) Date of Patent: Oct. 18, 2016

(54) RESIN COMPOSTION FOR WIRE COATING AND INSULATED WIRE COMPRISING THE SAME

(75) Inventors: Masaki Mitsunaga, Tokyo (JP); Zenichiro Shidara, Tokyo (JP); Hidenori Nakagawa, Tokyo (JP)

(73) Assignee: TEIJIN LIMITED, Osaka (JP)

( * ) Notice: Subject to any disclaimer, the term of this patent is extended or adjusted under 35 U.S.C. 154(b) by 735 days.

(21) Appl. No.: 13/878,807

(22) PCT Filed: Oct. 5, 2011

(86) PCT No.: PCT/JP2011/073458
§ 371 (c)(1),
(2), (4) Date: Jun. 10, 2013

(87) PCT Pub. No.: WO2012/050142
PCT Pub. Date: Apr. 19, 2012

(65) Prior Publication Data
US 2013/0251993 A1    Sep. 26, 2013

(30) Foreign Application Priority Data
Oct. 13, 2010 (JP) ................................. 2010-230620

(51) Int. Cl.
| H01B 3/42 | (2006.01) |
| C09D 7/12 | (2006.01) |
| C09D 167/00 | (2006.01) |
| H01B 7/295 | (2006.01) |
| H01B 3/30 | (2006.01) |
| C08K 3/22 | (2006.01) |
| C08K 5/13 | (2006.01) |
| C08K 5/524 | (2006.01) |
| C08K 7/24 | (2006.01) |

(Continued)

(52) U.S. Cl.
CPC ............. *H01B 3/421* (2013.01); *C09D 7/1216* (2013.01); *C09D 167/00* (2013.01); *H01B 3/306* (2013.01);
(Continued)

(58) Field of Classification Search
CPC ... C08L 67/025; C09D 167/00; H01B 3/421; Y10T 428/2933
USPC .......................................... 524/384; 428/375
See application file for complete search history.

(56) References Cited

U.S. PATENT DOCUMENTS

| 7,211,634 B1 * | 5/2007 | Martin .................. C08G 63/78 526/66 |
| 2008/0207799 A1 * | 8/2008 | Berndt ...................... D01F 1/09 523/222 |

(Continued)

FOREIGN PATENT DOCUMENTS

| EP | 2 180 017 | 4/2010 |
| JP | 9-263685 | 10/1997 |

(Continued)

OTHER PUBLICATIONS

International Preliminary Report on Patentability issued Apr. 23, 2013 and English translation of Written Opinion of the International Searching Authority issued Nov. 22, 2011 in International Application No. PCT/JP2011/073458.

(Continued)

*Primary Examiner* — Peter Y Choi
*Assistant Examiner* — Vincent A Tatesure
(74) *Attorney, Agent, or Firm* — Wenderoth, Lind & Ponack, L.L.P.

(57) ABSTRACT

A resin composition for wire coating, which is excellent in extrudability, heat deterioration resistance, abrasion resistance, flame retardancy and insulating properties, can achieve low smoke-producing properties and contains no halogen compound and an insulated wire obtained therefrom.

The resin composition for wire coating comprises (A) a specific thermoplastic polyester resin (component A), (B) a polyester block copolymer (component B), (C) a polycarbodiimide compound (component C), (D) magnesium hydroxide (component D), (E) an inorganic porous filler (component E), (F) a hindered phenol-based antioxidant (component F) and (G) a phosphorus-based antioxidant (component G) in a specific ratio.

20 Claims, 3 Drawing Sheets

(51) Int. Cl.
*C08L 67/02* (2006.01)
*C08L 79/00* (2006.01)

(52) U.S. Cl.
CPC .............. *H01B 3/423* (2013.01); *H01B 7/295* (2013.01); *C08K 3/22* (2013.01); *C08K 5/13* (2013.01); *C08K 5/524* (2013.01); *C08K 7/24* (2013.01); *C08K 2003/2224* (2013.01); *C08L 67/025* (2013.01); *C08L 79/00* (2013.01); *Y10T 428/2933* (2015.01)

(56) References Cited

U.S. PATENT DOCUMENTS

2009/0130356 A1* 5/2009 Moriuchi ............ C08L 23/0853 428/36.9
2010/0101824 A1   4/2010 Fujimoto et al.

FOREIGN PATENT DOCUMENTS

| | | |
|---|---|---|
| JP | 2002-37937 | 2/2002 |
| JP | 2002-343141 | 11/2002 |
| JP | 2007-211123 | 8/2007 |
| JP | 2008-159508 | 7/2008 |
| JP | 2009-249390 | 10/2009 |
| JP | 2010-100724 | 5/2010 |
| JP | 2010-121112 | 6/2010 |
| WO | 03/095557 | 11/2003 |

OTHER PUBLICATIONS

International Search Report issued Nov. 22, 2011 in International Application No. PCT/JP2011/073458.
Search Report issued Dec. 19, 2014 in corresponding European Application No. 11832576.0.

* cited by examiner

RESIN COMPOSTION FOR WIRE COATING AND INSULATED WIRE COMPRISING THE SAME

TECHNICAL FIELD

The present invention relates to a resin composition for wire coating. More specifically, it relates to a resin composition for wire coating which is obtained by mixing a thermoplastic polyester resin with a polycarbodiimide compound, magnesium hydroxide and an inorganic porous filler. The present invention also relates to a resin composition for wire coating which is excellent in extrudability, heat deterioration resistance, abrasion resistance, flame retardancy and insulating properties, achieves low smoke-producing properties and contains no halogen compound.

BACKGROUND ART

Heretofore, a material comprising polyvinyl chloride resin (PVC resin) has been used as a wire coating material. PVC resin as a wire coating material has excellent insulating properties and is inexpensive. However, when the wire coating material comprising PVC resin is burnt after it is scrapped, it causes an environmental pollution problem such as the generation of a gas containing chlorine at the time of the disposal of the scrappage. In the field of transportation such as automobiles and trains, wire coating materials are desired to be light in weight and thin along with the weight reduction of a car body and the space saving of a wire all of which are aimed to save energy. Then, an olefin-based material is proposed as an environmentally friendly wire coating material (refer to Patent Document 1). Although the olefin-based material is free from an environmental pollution problem, very useful and inexpensive, an olefin-based material which is satisfactory in terms of mechanical strength and abrasion resistance for the reduction of the weight and thickness of a wire coating material is not obtained yet.

Meanwhile, a thermoplastic polyester resin out of polyester resins which are engineering plastic polymers has been used as the above material other than olefins. Since the thermoplastic polyester resin is excellent in heat resistance, abrasion resistance, electric properties, chemical resistance and moldability and has low absorptivity and excellent dimensional stability, it is used in a wide variety of fields such as automobiles, electric and electronic appliances, insulating materials and OA equipment. For example, since it has the above characteristic properties, it is disclosed that it can reduce the weight and thickness of wire coating while it retain abrasion resistance (refer to Patent Document 2).

However, the further improvement of the heat resistance and mechanical properties of an insulating material for wires has been desired in recent years. Then, to improve heat resistance, there is proposed a material obtained by adding an epoxy group-containing additive to a thermoplastic polyester resin (refer to Reference Document 3). However, satisfactory heat deterioration resistance is not obtained yet.

To further improve heat resistance, there is also proposed a material obtained by adding a carbodiimide compound to a thermoplastic polyester resin (refer to Patent Document 4). However, when the softening temperature of the carbodiimide compound is low, that is, the molecular weight of the polycarbodiimide is low, there occurs a problem that heat deterioration resistance degrades due to a small steric barrier around the carbodiimide group. Further, there is another problem that the polycarbodiimide having a low softening temperature is adhered to a port for injecting raw materials at the time of producing a composition, thereby making it impossible to obtain industrially advantageous productivity.

There is proposed use of a composition having excellent heat resistance, abrasion resistance, flame retardancy and hydrolysis resistance, which is prepared by adding a polyester block copolymer, an inorganic porous filler and a carbodiimide compound to a thermoplastic polyester resin, as an insulated wire (refer to Patent Document 5). However, the further improvement of insulating properties is desired.

Further, there is proposed use of a composition having heat resistance, flame retardancy, hydrolysis resistance and abrasion resistance, capable of achieving low smoke-producing properties and containing no halogen compound, which is obtained by adding a polyester block copolymer, magnesium hydroxide, an inorganic porous filler and a carbodiimide compound to a thermoplastic polyester resin, as an insulated wire (refer to Patent Document 6). However, since insulating properties are degraded by magnesium hydroxide which is added to achieve low smoke-producing properties, the improvement of the insulating properties is desired.

(Patent Document 1) JP-A 2009-249390
(Patent Document 2) JP-A 2002-343141
(Patent Document 3) JP-A 9-263685
(Patent Document 4) JP-A 2007-211123
(Patent Document 5) JP-A 2010-100724
(Patent Document 6) JP-A 2010-121112

DISCLOSURE OF THE INVENTION

It is therefore an object of the present invention to provide a resin composition for wire coating which is excellent in extrudability, flexibility, heat deterioration resistance, abrasion resistance, flame retardancy and insulating properties, has low smoke-producing properties and contains no halogen compound.

The inventors of the present invention conducted studies on flexibility and heat deterioration resistance and found that a polyester block copolymer having a specific block length improves the flexibility and heat deterioration resistance of a thermoplastic polyester resin. They also found that when a specific polycarbodiimide having a high softening temperature is added, a high level of heat deterioration resistance can be achieved without impairing productivity. They further found that low smoke-producing properties can be achieved by using magnesium hydroxide having a specific particle diameter without reducing insulating properties. They also found that a high level of insulating properties can be achieved by using an inorganic porous filler having a specific particle diameter. Further, they found that the deterioration of physical properties, especially tensile elongation, caused by the reduction of heat stability by magnesium hydroxide and an inorganic porous filler can be suppressed by using a combination of a hindered phenol-based antioxidant and a phosphorus-based antioxidant. The present invention was accomplished based on these findings.

According to the present invention, there is provided
(1) a resin composition for wire coating comprising:
(A) 100 parts by weight of a thermoplastic polyester resin (component A) having a terminal carboxyl group concentration of not more than 20 eq/ton and an intrinsic viscosity of 0.7 to 1.4 dl/g;
(B) 40 to 150 parts by weight of a polyester block copolymer (component B) obtained by carrying out a transesterification reaction between 50 to 90 wt % of a soft segment (component B-1) and 50 to 10 wt % of a hard segment (component B-2) and having an intrinsic viscosity of 0.6 to 1.1 dl/g and a melting point of 190 to 230° C., the component B-1 comprising 100 parts by mole of acid components consisting of 10 to 40 mol % of an aliphatic dicarboxylic acid component having 6 to 12 carbon atoms (component B-1-1) and 90 to 60 mol % of isophthalic acid (component B-1-2) and 100 parts by mole of an aliphatic α,ω-diol having 6 to 12 carbon atoms (component B-1-3), and the component B-2 comprising 100 parts by mole of terephthalic acid (component B-2-1) and 100 parts by mole of an aliphatic α,ω-diol having 2 to 4 carbon atoms (component B-2-2);

(C) 0.1 to 10 parts by weight of a polycarbodiimide compound having a softening temperature of 50° C. or higher;

(D) 10 to 50 parts by weight of magnesium hydroxide having an average particle diameter of 0.1 to 2 μm (component D);

(E) 0.5 to 5 parts by weight of an inorganic porous filler having an average particle diameter of 0.1 to 1 μm (component E);

(F) 0.002 to 2.5 parts by weight of a hindered phenol-based antioxidant (component F); and (G) 0.002 to 2.5 parts by weight of a phosphorus-based antioxidant (component G).

According to a first preferred aspect of the present invention, there is provided (2) a resin composition described in (1), wherein the component D is surface treated with at least one surface treating agent selected from the group consisting of higher fatty acids, anionic surfactants, phosphoric acid esters, coupling agents and esters of a polyhydric alcohol and a fatty acid.

According to a second preferred aspect of the present invention, there is provided (3) a resin composition described in (1) or (2), wherein the component A is at least one thermoplastic polyester resin selected from the group consisting of polybutylene naphthalene dicarboxylate resin (component A-1) and polybutylene terephthalate resin (component A-2).

According to a third preferred aspect of the present invention, there is provided (4) a resin composition described in (3), wherein the component A contains not less than 50 wt % of polybutylene naphthalene dicarboxylate resin (component A-1).

According to a fourth preferred aspect of the present invention, there is provided (5) an insulated wire which contains a conductor and an insulating material coated on the exterior surface of the conductor, wherein the insulating material is the resin composition described in any one of (1) to (4).

According to a fifth preferred aspect of the present invention, there is provided (6) an insulated wire described in (5), wherein the thickness of the insulating material is 0.01 to 0.5 mm.

According to a sixth preferred aspect of the present invention, there is provided (7) an insulated wire described in (5), which has a sheath layer on the surface of the insulating material.

The present invention includes use of the resin composition described in (1) for coating a wire.

The present invention includes a method of producing an insulated wire by extruding the resin composition described in (1) onto the exterior surface of a conductor. According to this method, an insulated wire which is excellent in flexibility, heat deterioration resistance, abrasion resistance, flame retardancy and insulating properties and hardly smokes is obtained.

While the mode for carrying out the present invention will be described hereinbelow, it is illustrative and not restrictive and various changes may be made in the invention without departing from the technical idea of the present invention.

EXPLANATION OF REFERENCE NUMERALS

Figure 1:
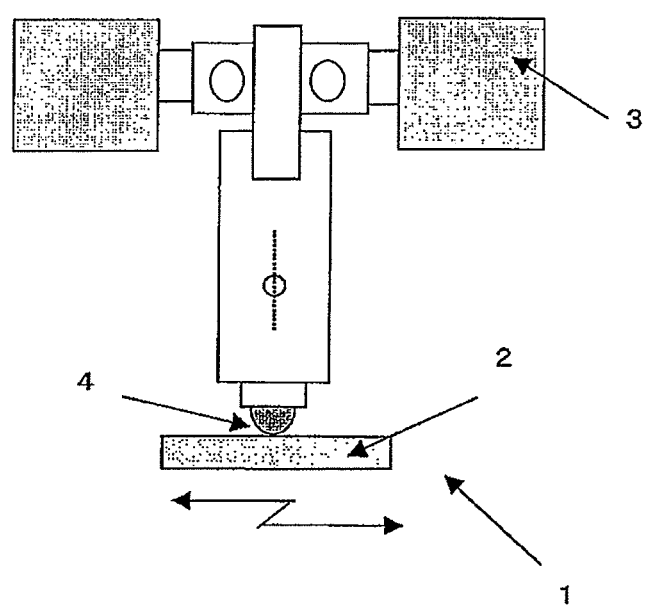
FIG. 1 is a diagram for explaining a method of carrying out an abrasion resistance test on a molded article.

1. Reciprocating kinetic friction tester
2. Measurement sample
3. Load
4. Steel ball
5. Collection bottle
6. Tension dumbbell (ISO527 1A type)
7. Burner (for UL 5V)
8. Reflectance/transmittance meter (HR-100)
9. Insulated wire
10. Conductor
11. Insulating material
12. 90° sharp edge
13. Power supply

BEST MODE FOR CARRYING OUT THE INVENTION (Component A: Thermoplastic Polyester Resin)

The component A is a thermoplastic polyester resin. Examples of the thermoplastic polyester resin include polyethylene terephthalate resin, polybutylene terephthalate resin (component A-2), polyethylene naphthalate resin, polybutylene naphthalene dicarboxylate resin (component A-1), polycyclohexane dimethyl terephthalate resin, polytrimethylene terephthalate resin and polytrimethylene naphthalate resin. Out of these, polybutylene naphthalene dicarboxylate resin and polybutylene terephthalate resin (component A-2) are preferably used. The content of the polybutylene naphthalene dicarboxylate resin (component A-1) is preferably not less than 50 wt %, more preferably not less than 60 wt %.

The terminal carboxyl group concentration measured in benzyl alcohol at 35° C. of the thermoplastic polyester resin (component A) is not more than 20 eq/ton, preferably not more than 18 eq/ton, much more preferably not more than 16 eq/ton. When the terminal carboxyl group concentration is higher than 20 eq/ton, target heat deterioration resistance cannot be obtained even by using a polycarbodiimide compound.

The intrinsic viscosity measured in orthochlorophenol at 35° C. of the thermoplastic polyester resin (component A) is 0.7 to 1.4 dl/g, preferably 0.8 to 1.4 dl/g, more preferably 0.9 to 1.4 dl/g. When the intrinsic viscosity falls within this range, a resin composition having excellent heat deterioration resistance and abrasion resistance can be obtained, and excellent extrusion moldability can be obtained.

(Component A-1: Polybutylene Naphthalene Dicarboxylate Resin)

The polybutylene naphthalene dicarboxylate resin (may be abbreviated as PBN hereinafter) as the component A-1 can be produced by using a dicarboxylic acid component essentially composed of naphthalenedicarboxylic acid and/or an ester forming derivative of naphthalenedicarboxylic acid and a glycol component essentially composed of 1,4-butanediol.

The naphthalenedicarboxylic acid component is mainly 2,6-naphthalenedicarboxylic acid or 2,7-naphthalenedicarboxylic acid but another dicarboxylic acid may be used in combination as long as characteristic properties are not impaired.

Examples of the other carboxylic acid include aromatic dicarboxylic acids such as terephthalic acid, isophthalic acid, 4,4'-diphenyldicarboxylic acid, diphenoxyethane-4,4'-dicarboxylic acid, diphenylsulfone-4,4'-dicarboxylic acid and diphenyl ether-4,4'-dicarboxylic acid, aliphatic dicarboxylic acids such as adipic acid, sebacic acid, succinic acid and oxalic acid, and alicyclic dicarboxylic acids such as cyclohexanedicarboxylic acid. They may be used alone or in combination of two or more and can be arbitrarily selected according to purpose. The amount of the other carboxylic acid is preferably not more than 30 mol %, more preferably not more than 20 mol % based on the total of all the acid components.

The ester forming derivative of naphthalenedicarboxylic acid is mainly dimethyl 2,6-naphthalenedicarboxylate or dimethyl 2,7-naphthalenedicarboxylate. As long as characteristic properties are not impaired, the ester forming derivative of another dicarboxylic acid may be used in combination.

Examples of the ester forming derivative of another dicarboxylic acid include lower dialkyl esters of an aromatic dicarboxylic acid such as terephthalic acid, isophthalic acid, 4,4'-diphenyldicarboxylic acid, diphenoxyethane-4,4'-dicarboxylic acid, dphenylsulfone-4,4'-dicarboxylic acid and diphenyl ether-4,4'-dicarboxylic acid, lower dialkyl esters of an alicyclic dicarboxylic acid such as cyclohexanedicarboxylic acid, and lower dialkyl esters of an aliphatic dicarboxylic acid such as adipic acid, sebacic acid, succinic acid and oxalic acid. They may be used alone or in combination of two or more and may be arbitrarily selected according to purpose. The amount of the ester forming derivative of another dicarboxylic acid is preferably not more than 30 mol %, more preferably not more than 20 mol % based on the total of all the ester forming derivatives of dicarboxylic acids.

A small amount of a carboxylic acid component having 3 or more functional groups such as trimellitic acid may be used, or a small amount of an acid anhydride such as trimellitic anhydride may be used as well. A small amount of a hydroxycarboxylic acid such as lactic acid or glycolic acid, or an alkyl ester thereof may be used and arbitrarily selected according to purpose.

The glycol component is mainly 1,4-butanediol but another glycol component may be used in combination as long as characteristic properties are not impaired. One or more alkylene glycols such as ethylene glycol, 1,3-propylene glycol, 1,2-propylene glycol, neopentylene glycol, hexamethylene glycol, decamethylene glycol, cyclohexanedimethanol, diethylene glycol, triethylene glycol, poly(oxy)ethylene glycol, poly(oxy)tetramethylene glycol and poly(oxy)methylene glycol may be used as the other glycol component and may be arbitrarily selected according to purpose. Further, a small amount of a polyhydric alcohol component such as glycerin may be used. A small amount of an epoxy compound may also be used. The amount of the other glycol component is preferably not more than 30 mol %, more preferably not more than 20 mol % based on the total of all the glycol components.

The amount of the glycol component is preferably 1.1 to 1.4 times larger than the molar amount of the above dicarboxylic acid or the ester forming derivative of a dicarboxylic acid. When the amount of the glycol component is less than 1.1 times, an esterification or transesterification reaction does not fully proceed disadvantageously. When the amount of the glycol component is more than 1.4 times, the reaction rate becomes slow though the reason for this is unknown, and the amount of a by-product such as tetrahydrofuran produced from an excessive glycol component becomes large disadvantageously.

A titanium compound is used as a polymerization catalyst in the production of PBN. The titanium compound used as a polymerization catalyst is preferably a tetraalkyl titanate such as tetra-n-propyl titanate, tetraisopropyl titanate, tetra-n-butyl titanate, tetra-sec-butyl titanate, tetra-t-butyl titanate, tetra-n-hexyl titanate, tetracyclohexyl titanate, tetraphenyl titanate or tetrabenzyl titanate. A mixture of these may also be used. Out of these titanate compounds, tetra-n-propyl titanate, tetraisopropyl titanate and tetra-n-butyl titanate are preferred, and tetra-n-butyl titanate is most preferred. The amount of the titanium compound is preferably 10 to 60 ppm, more preferably 15 to 30 ppm as the content of a titanium atom in the formed PBN.

When the content of the titanium atom in the formed PBN exceeds 60 ppm, the color and heat stability of the thermoplastic polyester resin composition of the present invention deteriorate disadvantageously. When the content of the titanium atom is not more than 10 ppm, good polymerization activity cannot be obtained and PBN having sufficiently high intrinsic viscosity cannot be obtained disadvantageously.

PBN is preferably produced through a step for carrying out an esterification or transesterification reaction between a dicarboxylic acid component which is mainly naphthalenedicarboxylic acid and/or an ester forming derivative thereof and a glycol component which is mainly 1,4-butanediol in the presence of a titanium compound and a subsequent polycondensation reaction step. The temperature at the end of the esterification or transesterification reaction is in the range of preferably 180 to 220° C., more preferably 180 to 210° C. When the temperature at the end of the esterification or transesterification reaction is higher than 220° C., the reaction rate becomes higher but the amount of a by-product such as tetrahydrofuran becomes large disadvantageously. When the temperature is lower than 180° C., the reaction does not proceed. The reaction product (bisglycol ether and/or a low polymer thereof) obtained from the esterification or transesterification reaction is preferably polycondensed under a reduced pressure of not more than 0.4 kPa (3 Torr) at a temperature higher than the melting point of PBN and lower than 270° C. When the polycondensation reaction temperature is higher than 270° C., the reaction rate lowers and coloration becomes marked disadvantageously.

(Component A-2: Polybutylene Terephthalate Resin)

The polybutylene terephthalate resin (may be abbreviated as PBT hereinafter) as the component A-2 is obtained from a polycondensation reaction between terephthalic acid or a derivative thereof and 1,4-butanediol or a derivative thereof. As long as the object of the present invention is not impaired, another dicarboxylic acid or glycol may be copolymerized.

Examples of the copolymerizable dicarboxylic acid include aromatic dicarboxylic acids such as isophthalic acid, 2-chloroterephthalic acid, 2,5-dichloroterephthalic acid, 2-methylterephthalic acid, 4,4-stilbenedicarboxylic acid, 4,4-biphenyldicarboxylic acid, orthophthalic acid, 2,6-naphthalenedicarboxylic acid, bisbenzoic acid, bis(p-carboxyphenyl)methane, anthracenedicarboxylic acid, 4,4-diphenyl ether dicarboxylic acid and 4,4-diphenoxyethane dicarboxylic acid, and aliphatic dicarboxylic acids and alicyclic dicarboxylic acids such as adipic acid, sebacic acid, azelaic acid, dodecanedioic acid, 1,3-cyclohexanedicarboxylic acid and 1,4-cyclohexanedicarboxylic acid. These copolymerizable dicarboxylic acids may be used alone or in combination of two or more.

Examples of the copolymerizable glycol include 1,2-propylene glycol, 1,3-propanediol, 2,2-dimethyl-1,3-propanediol, trans- or cis-2,2,4,4-tetramethyl-1,3-cyclobutanediol, neopentyl glycol, 1,5-pentanediol, 1,6-hexanediol, 1,4-cyclohexanedimethanol, 1,3-cyclohexanedimethanol, decamethylene glycol, cyclohexanediol, p-xylenediol and bisphenol A. If small in quantity, at least one long-chain diol having a molecular weight of 400 to 6,000, that is, polyethylene glycol, poly-1,3-propylene glycol or polytetramethylene glycol may be copolymerized. These copolymerizable glycols may be used alone or in combination of two or more.

PBT can be branched by introducing a small amount of a branching agent. Although the type of the branching agent is not limited, trimesic acid, trimellitic acid, trimethylolethane, trimethylolpropane and pentaerythritol may be used.

The terminal group structure of the obtained PBT is not particularly limited if the terminal carboxyl group concentration is not more than 20 eq/ton, and the amount of a terminal hydroxyl group may be almost the same, larger or smaller than the amount of a terminal carboxyl group. These terminal groups may be capped by reacting a compound having reactivity to the terminal groups.

As for the method of producing PBT, the dicarboxylic acid component and the diol component are polymerized under heating in the presence of a polycondensation catalyst containing titanium, germanium or antimony in accordance with a commonly used method, and the by-produced water or lower alcohol is discharged to the outside of the system. Examples of the germanium-based polymerization catalyst include oxides, hydroxides, halides, alcoholates and phenolates of germanium, more specifically germanium oxide, germanium hydroxide, germanium tetrachloride and tetramethoxygermanium.

In the present invention, a compound such as a manganese, zinc, calcium or magnesium compound may be used in combination in the transesterification reaction which is the previous stage of conventionally known polycondensation, and polycondensation may also be carried out by using a phosphoric acid or phosphorous acid compound to deactivate the catalyst after the end of the transesterification reaction.

(Component B: Polyester Block Copolymer)

The polyester block copolymer (component B) is obtained by carrying out a transesterification reaction between 50 to 90 wt % of a soft segment (component B-1) and 50 to 10 wt % of a hard segment (component B-2).

The polyester block copolymer (component B) has an intrinsic viscosity measured in orthochlorophenol at 35° C. of 0.6 to 1.1 dl/g, preferably 0.7 to 1.0 dl/g, more preferably 0.8 to 1.0 dl/g. When the intrinsic viscosity is lower than 0.6 dl/g, the thermal motion of a polymer chain becomes active due to the short polymer chain with the result that a thermal decomposition reaction during extrusion processing or a heat deterioration resistance test is promoted, thereby deteriorating flexibility and heat deterioration resistance. When the intrinsic viscosity is higher than 1.1 dl/g, the probability that hard segments become adjacent to each other between molecules or in the molecule becomes high with the result that crystallization derived from the hard segment is promoted during the heat deterioration resistance test, thereby deteriorating heat deterioration resistance.

The polyester block copolymer (component B) has a melting point of 190 to 230° C., preferably 195 to 225° C., more preferably 200 to 220° C. When the melting point is lower than 190° C., a heat decomposition reaction during a heat deterioration resistance test is promoted, thereby deteriorating heat deterioration resistance and when the melting point is higher than 230° C., crystallization derived from the hard segment is promoted during a heat deterioration resistance test, thereby deteriorating heat deterioration resistance.

The constituent segments of the polyester block copolymer (component B) are the soft segment (component B-1) and the hard segment (component B-2). The content of the component B-1 is 50 to 90 wt % and the content of the component B-2 is 50 to 10 wt % based on 100 wt % of the total of the components B-1 and B-2. Preferably, the content of the component B-1 is 50 to 80 wt % and the content of the component B-2 is 50 to 20 wt %. When the content of the component B-1 is lower than 50 wt %, that is, the content of the component B-2 is higher than 50 wt %, tensile elongation greatly lowers with the result that flexibility required for a wire coating material is lost. When the content of the component B-1 is higher than 90 wt %, that is, the content of the component B-2 is lower than 10 wt %, sufficiently high heat deterioration resistance and abrasion resistance cannot be ensured.

(Component B-1: Soft Segment)

The soft segment (component B-1) is composed of 100 parts by mole of an acid component consisting of 10 to 40 mol % of an aliphatic dicarboxylic acid component having 6 to 12 carbon atoms (component B-1-1) and 90 to 60 mol % of isophthalic acid (component B-1-2) and 100 parts by mole of an aliphatic α,ω-diol having 6 to 12 carbon atoms (component B-1-3).

When the number of carbon atoms of the aliphatic dicarboxylic acid component (component B-1-1) is 5 or less, the distance between carboxyl groups becomes short and the component is easily hydrolyzed, thereby deteriorating heat deterioration resistance. When the number of carbon atoms of the aliphatic dicarboxylic acid component is 13 or more, flexibility becomes so strong that abrasion resistance degrades.

Isophthalic acid (component B-1-2) is used to improve the hydrolysis resistance of the polyester block copolymer (component B). Use of an aromatic dicarboxylic acid such as phthalic acid or terephthalic acid in combination with isophthalic acid for this purpose is permissible if it is within the scope of the present invention. In this case, the amount of isophthalic acid is at least not less than 60 mol %, preferably not less than 70 mol %, particularly preferably not less than 80 mol %.

The aliphatic α,ω-diol (component B-1-3) is a diol compound represented by $HO(CH_2)_nOH$ (n is an integer of 6 to 12). When n is 5 or less, the polyester polymer deteriorates in tensile elongation and is not suitable for use as a wire coating material and when n is 13 or more, the polyester polymer deteriorates in abrasion resistance.

The content of the aliphatic dicarboxylic acid having 6 to 12 carbon atoms (component B-1-1) is 10 to 40 mol %, preferably 20 to 38 mol %, particularly preferably 25 to 35 mol % based on 100 mol % of the total of all the acid components. Therefore, the content of isophthalic acid (component B-1-2) is 90 to 60 mol %, preferably 80 to 62 ml %, particularly preferably 75 to 65 mol %. When the content of the component B-1-1 is lower than 10 mol %, that is, the content of the component B-1-2 is higher than 90 mol %, the polyester polymer deteriorates in tensile elongation and is not suitable for use as a wire coating material. When the content of the component B-1-1 is higher than 40 mol %, that is, the content of the component B-1-2 is lower than 60 mol %, a heat decomposition reaction during a heat deterioration resistance test is apt to be promoted with the result of the polyester polymer deteriorates in heat deterioration resistance.

(Component B-2: Hard Segment)

The hard segment (component B-2) is composed of 100 parts by mole of terephthalic acid (component B-2-1) and 100 parts by mole of an aliphatic $\alpha,\omega$-diol having 2 to 4 carbon atoms (component B-2-2).

Terephthalic acid (component B-2-1) is used to improve the crystallinity and abrasion resistance of the polyester block copolymer (component B). Use of an aromatic dicarboxylic acid such as 2,6-naphthalenedicarboxylic acid or 4,4'-diphenyldicarboxylic acid in combination with terephthalic acid for this purpose is permissible if it is within the scope of the present invention. In this case, the content of terephthalic acid is at least not less than 60 mol %, preferably not less than 70 mol %, particularly preferably not less than 80 mol %.

The aliphatic $\alpha,\omega$-diol having 2 to 4 carbon atoms (component B-2-2) is used to enhance the crystallinity of the hard segment and accelerate the crystallization of the hard segment, and examples thereof include ethylene glycol, trimethylene glycol and tetramethylene glycol, out of which tetramethylene glycol is particularly preferred.

The polyester block copolymer (component B) can be obtained by carrying out a transesterification reaction between a polyester (component B-1') for the soft segment which is composed of the above soft segment (component B-1) alone and a polyester for the hard segment (component B-2') which is composed of the above hard segment (component B-2) alone under reduced pressure while the reaction product is stirred and heated in the presence of a catalyst.

It is important that this transesterification reaction should be continued until the melting point of the obtained polyester block copolymer (component B) becomes 2 to 40° C. lower than the melting point of the polyester for the hard segment. When the reduction of the melting point is less than 2° C., the obtained polymer exhibits the characteristic properties of a mixture of the polyester for the soft segment (component B-1') and the polyester for the hard segment (component B-2') rather than a block copolymer and does not show sufficiently high tensile elongation. When the reduction of melting point is 40° C. or more, the block length of the hard segment (component B-2) of the obtained polyester block copolymer becomes too short, whereby satisfactory crystallinity is not obtained and abrasion resistance degrades.

The heating temperature is not particularly specified but desirably controlled to a range of 220 to 270° C. to reduce the viscosity so that the obtained polyester block copolymer can be fully stirred and eliminate an adverse influence by heat deterioration, and the pressure is desirably not more than 0.4 kPa (3 Torr).

Examples of the transesterification reaction catalyst include compounds containing titanium, germanium or antimony. In this case, a catalyst deactivator such as phosphoric acid, phosphorous acid, phosphoric acid, phosphinic acid or a derivative thereof is added to deactivate catalytic ability so as to prevent the transesterification reaction from further proceeding at the time of remelting. The types and amounts of the catalyst and the catalyst deactivator differ according to the types, amounts and molecular weights of the polyester for the soft segment in use (component B-1') and the polyester for the hard segment in use (component B-2') and also various factors such as stirring conditions and temperature. Therefore, it is difficult to determine them nonequivocally.

The terminal group structure of the polyester block copolymer (component B) is not particularly limited but the terminal carboxyl group concentration thereof is preferably not more than 50 eq/ton, more preferably not more than 40 eq/ton, much more preferably not more than 35 eq/ton. As the terminal carboxyl group concentration becomes lower, the heat stability of the polyester block copolymer becomes higher. The amount of the terminal hydroxyl group may be almost the same, larger or smaller than the amount of the terminal carboxyl group. These terminals may be capped by reacting a compound having reactivity to the terminal groups.

As for the method of producing the polyester for the soft segment (component B-1') or the polyester for the hard segment (component B-2'), the polyesters can be each obtained by carrying out an esterification reaction between a dicarboxylic acid component and a diol component under heating in the presence of a catalyst containing titanium, germanium or antimony in accordance with a predetermined method, discharging by-produced water or lower alcohol to the outside of the system, and polycondensing the reaction product under reduced pressure while it is stirred and heated in the presence of the catalyst. Examples of the catalyst include titanium tetrabutoxide, germanium oxide, germanium hydroxide, germanium tetrachloride and tetramethoxygermanium. The catalyst can be deactivated by means of a catalyst deactivator such as phosphoric acid, phosphorous acid, phosphoric acid, phosphinic acid or a derivative thereof after the end of polycondensation.

The content of the polyester block copolymer (component B) is 40 to 150 parts by weight, preferably 50 to 140 parts by weight, more preferably 60 to 130 parts by weight based on 100 parts by weight of the thermoplastic polyester resin (component A). When the content is lower than 40 parts by weight, sufficiently high flexibility cannot be provided and when the content is higher than 150 parts by weight, abrasion resistance degrades disadvantageously.

(Component C: Polycarbodiimide Compound)

The polycarbodiimide compound (component C) is a (co)polymer comprising a polyhydric isocyanate compound. Examples of the above polyhydric isocyanate include hexamethylene diisocyanate, xylene diisocyanate, cyclohexane diisocyanate, pyridine diisocyanate, 2,4-tolylene diisocyanate, 2,6-tolylene diisocyanate, 4,4-diphenylmethanediisocyanate, p-phenylene diisocyanate, m-phenylene diisocyanate and 1,5-naphthylene diisocyanate. Out of these, cyclohexane diisocyanate and 2,4-tolylene diisocyanate are preferably used.

Examples of the polycarbodiimide compound (component C) include the Carbodilite HMV-8CA and Carbodilite LA-1 of Nisshinbo Industries, Ltd. and Stabaxol P of Rhein Chemie Co., GmbH.

The content of the polycarbodiimide compound (component C) is 0.1 to 10 pars by weight, preferably 0.3 to 9 parts by weight, more preferably 0.5 to 8 parts by weight based on 100 parts by weight of the thermoplastic polyester resin (component A). When the content is lower than 0.1 part by weight, the effect of improving heat deterioration resistance and abrasion resistance is not satisfactory and when the content is higher than 10 parts by weight, extrusion processability markedly deteriorates due to an increase in melt viscosity, thereby not obtaining sufficiently high tensile elongation.

The softening temperature of the polycarbodiimide compound (component C) is 50° C. or higher, preferably 60° C. or higher, more preferably 70° C. or higher. When the softening temperature is lower than 50° C., the resin composition fuses under a hopper for supplying raw materials at the time of extrusion to cause a shoot-up, thereby making extrusion difficult. Since it is difficult to produce a polycarbodiimide compound having a softening temperature higher than 120° C., the polycarbodiimide compound is of no industrial value. Therefore, the upper limit of the softening temperature of the polycarbodiimide compound (component C) is substantially 120° C.

(Component D: Magnesium Hydroxide)

The main purpose of using magnesium hydroxide (component D) is to provide flame retardancy, reduce smoking and prevent insulating properties from being impaired. The magnesium hydroxide (component D) has an average particle diameter measured by a laser diffraction scattering method of 0.1 to 2 µm, preferably 0.4 to 1.0 µm and rarely or seldom agglomerates. When the average particle diameter is smaller than 0.1 µm, special grinding is required, thereby boosting cost and reducing an industrial effect disadvantageously and when the average particle diameter is larger than 2 µm, insulating properties degrade probably due to the agglomeration of magnesium hydroxide in the composition.

The specific surface area measured by a BET method of each magnesium hydroxide particle is not particularly limited but preferably 1 to 10 $m^2/g$. Within this range, excellent flame retardancy and insulating properties are obtained.

Preferably, magnesium hydroxide (component D) has a total content of the metals of an iron compound, a manganese compound, a cobalt compound, a chromium compound, a copper compound, a vanadium compound and a nickel compound of not more than 0.01 wt % since the heat stability of the composition is not deteriorated. Therefore, it is preferred that magnesium chloride or magnesium nitrate as a raw material of magnesium hydroxide (component D) and an alkaline substance such as an alkali metal hydroxide, ammonia or magnesium oxide should be purified.

Magnesium hydroxide (component D) may be mixed with the composition as it is in order to provide flame retardancy and low smoke-producing properties without deteriorating insulating properties. However, it is preferred to treat magnesium hydroxide with a surface treating agent before use. The surface treating agent is at least one selected from the group consisting of higher fatty acids, anionic surfactants, phosphoric acid esters, coupling agents (silane-based, titanate-based and aluminum-based) and esters of a polyhydric alcohol and a fatty acid. Examples of the surface treating agent which is preferably used include higher fatty acids having 10 or more carbon atoms such as stearic acid, erucic acid, palmitic acid, lauric acid and behenic acid, and alkali metal salts of the above higher fatty acids; sulfate ester salts of a higher alcohol such as stearyl alcohol and oleyl alcohol; anionic surfactants such as sulfate ester salts, amide-linked sulfate ester salts, ester-linked sulfate ester salts, ester-linked sulfonates, amide-linked sulfate salts, ether-linked sulfate salts, ether-linked alkyl aryl sulfate salts and ester-linked alkyl aryl sulfate salts and amide-linked alkyl aryl sulfate salts of polyethylene glycol ether; phosphoric acid esters such as mono- or di-esters of orthophosphoric acid and oleyl alcohol or stearyl alcohol, mixtures thereof, or acid type or alkali metal salts or amine salts thereof; silane coupling agents such as vinyl ethoxysilane, vinyl-tris(2-methoxyethoxy)silane, gamma-methacryloxypropyl trimethoxysilane, gamma-aminopropyl trimethoxysilane, beta-(3,4-epoxycyclohexyl)ethyl trimethoxysilane, gamma-glycidoxypropy trimethoxysilane and gamma-mercaptopropyl trimethoxysilane; titanate-based coupling agents such as isopropyltriisostearoyl titanate, isopropyl tris(dioctylpyrophosphate)titanate, isopropyl tri(N-aminoethyl-aminoethyl)titanate and isopropyl tridecylbenzenesulfonyl titanate; aluminum-based coupling agents such as acetoalkoxyaluminum diisopropylate; and esters of a polyhydric alcohol and a fatty acid such as glycerin monostearate and glycerin monooleate. To surface treat magnesium hydroxide with the above surface treating agent, a wet or dry process known per se may be used. For example, in the wet process, a surface treating agent in a liquid or emulsion form is added to and mixed with magnesium hydroxide slurry mechanically completely at a temperature of up to 100° C. In the dry process, a surface treating agent in a liquid, emulsion or solid form is added to and mixed with magnesium hydroxide powders completely while they are fully stirred with a Henschel mixer under heating or non-heating. The amount of the surface treating agent may be suitably selected but preferably not more than about 10 wt % based on the weight of the magnesium hydroxide. Means such as rinsing, dehydration, granulation, drying, grinding and classification are suitably selected and carried out on the surface treated magnesium hydroxide as required to obtain the final product.

The content of magnesium hydroxide (component D) is 10 to 50 parts by weight, preferably 15 to 40 parts by weight, particularly preferably 20 to 30 parts by weight based on 100 parts by weight of the thermoplastic polyester resin (component A). When the content is lower than 10 parts by weight, low smoke-producing properties become unsatisfactory and when the content is higher than 50 parts by weight, flexibility degrades.

(Component E: Inorganic Porous Filler)

The main purpose of using an inorganic porous filler (component E) is to improve insulating properties. The dielectric resistance of the composition tends to lower as the temperature rises. However, when a specific amount of the inorganic porous filler (component E) is used, dielectric resistance becomes stable even at a high temperature with the result of improved insulating properties. The inorganic porous filler (component E) has an average particle diameter measured by a laser diffraction scattering method of 0.1 to 1 µm, preferably 0.2 to 0.8 µm and almost never or rarely agglomerates. When the average particle diameter is smaller than 0.1 µm, a special grinding process is required, thereby boosting cost and reducing an industrial effect disadvantageously. When the average particle diameter is larger than 1 µm, the effect of improving insulating properties becomes small probably due to the agglomeration of the inorganic porous filler in the composition. The specific surface area measured by the BET method of the inorganic porous filler (component E) is not particularly specified but preferably not less than 3 $m^2/g$, particularly preferably not less than 5 $m^2/g$.

The inorganic porous filler (component E) is an inorganic particle having a small apparent specific gravity as compared with the true specific gravity of a filler and a porous structure therein. This material is classified as microporous, mesoporous or macroporous according to the size of its pore. Fired kaolin, zeolite, mesalite, anthracite, foamed perlite and activated carbon are used as the materials of these. Out of these, fired kaolin is most preferred from the viewpoints of an effect on physical properties and no coloration.

Fired kaolin is amorphous kaolin produced by firing kaolin purified by the wet process at about 600° C. to eliminate crystal water and destroying the original crystal structure. This treatment enhances the activity of kaolin and promotes the adsorptive immobilization of a free ion, thereby increasing an insulating effect.

The content of the inorganic porous filler (component E) is 0.5 to 5 parts by weight, preferably 0.8 to 4.5 parts by weight, more preferably 1 to 4 parts by weight based on 100 parts by weight of the thermoplastic polyester resin (component A). When the content is lower than 0.5 part by weight, no insulation property improving effect is obtained and when the content is higher than 5 parts by weight, tensile elongation lowers and flexibility degrades.

(Component F: Hindered Phenol-Based Antioxidant)

The main purpose of using a hindered phenol-based antioxidant is to improve the heat stability and heat deterioration resistance of the resin composition for wire coating at the time of molding.

Examples of the hindered phenol-based antioxidant (component F) include α-tocopherol, butylhydroxytoluene, cinnapyl alcohol, vitamin E, octadecyl-3(3,5-di-tert-butyl-4-hydroxyphenyl)propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidene-bis(3-methyl-6-tert-butylphenol), triethylene glycol-N-bis-3-(3-tert-butyl-4-hydroxy-5-methylphenyl)propionate, 1,6-hexanediol-bis[3-(3,5-di-tert-butyl-4-hydroxyphenyl)propionate], bis[2-tert-butyl-4-methyl-6-(3-tert-butyl-5-methyl-2-hydroxybenzyl)phenyl]terephthalate, 3,9-bis{2-[3-(3-tert-butyl-4-hydroxy-5-methylphenyl)propionyloxy]-1,1-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2'-thiodiethylenebis-[3-(3,5-di-tert-butyl-4-hydroxyphenyl) propionate], 2,4-bis(n-octylthio)-6-(4-hydroxy-3,5-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris (3,5-di-tert-butyl-4-hydroxybenzyl) benzene, tris (3,5-di-tert-butyl-4-hydroxyphenyl) isocyanurate, tris (3,5-di-tert-butyl-4-hydroxybenzyl) isocyanurate, 1,3,5-tris(4-tert-butyl-3-hydroxy-2,6-dimethylbenzyl)isocyanurate, 1,3,5-tris-2 [3(3,5-di-tert-butyl-4-hydroxyphenyl)propionyloxy]ethyl isocyanurate and tetrakis[methylene-3-(3,5-di-tert-butyl-4-hydroxyphenyl) propionate]methane. Out of these, octadecyl-3-(3,5-di-tert-butyl-4-hydroxyphenyl)propionate (typical commercially available product is Irganox 1076 (trade name) of CIBA SPECIALTY CHEMICALS) is preferred, and all of these hindered phenol-based antioxidants are easily acquired. They may be used alone or in combination of two or more.

The content of the phenol-based antioxidant (component F) is 0.002 to 2.5 parts by weight, preferably 0.004 to 1.5 parts by weight, more preferably 0.005 to 0.5 part by weight based on 100 parts by weight of the thermoplastic polyester resin (component A). When the content is lower than 0.002 part by weight, the effect of improving heat stability and heat deterioration resistance is not obtained and when the content is higher than 2.5 parts by weight, heat stability and heat deterioration resistance degrade disadvantageously. It is needless to say that when heat stability degrades, tensile elongation lowers and flexibility is lost.

(Component G: Phosphorus-Based Antioxidant)

The main purpose of using a phosphorus-based antioxidant (component G) is to improve the heat stability of the resin composition at the time of molding and the heat deterioration resistance of the resin composition for wire coating.

The phosphorus-based antioxidant (component G) is selected from phosphorous acid, phosphoric acid, phosphorous acid, phosphonic acid, esters thereof and a tertiary phosphine.

Examples of the phosphite compound include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, 2,2-methylenebis(4,6-di-tert-butylphenyl)octyl phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl) phosphite, distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, bis{2,4-bis(1-methyl-1-phenylethyl)phenyl}pentaerythritol diphosphite, phenyl bisphenol A pentaerythritol diphosphite, bis(nonylphenyl)pentaerythritol diphosphite and dicyclohexyl pentaerythritol diphosphite.

Other phosphite compounds which react with a dihydric phenol to have a cyclic structure may also be used. Examples thereof include 2,2'-methylenebis(4,6-di-tert-butylphenyl)(2,4-di-tert-butylphenyl)phosphite, 2,2'-methylenebis(4,6-di-tert-butylphenyl)(2-tert-butyl-4-methylphenyl)phosphite and 2,2'-methylidenebis(4-methyl-6-tert-butylphenyl)octyl phosphite.

Examples of the phosphate compound include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Out of these, triphenyl phosphate and trimethyl phosphate are preferred.

Examples of the phosphonite compound include tetrakis (2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenylphosphonite, bis(2,4-di-tert-butylphenyl)-3-phenyl-phenylphosphonite, bis(2,6-di-n-butylphenyl)-3-phenyl-phenyl phosphonite, bis(2,6-di-tertbutylphenyl)-4-phenyl-phenyl phosphonite and bis(2,6-di-tert-butylphenyl)-3-phenyl-phenyl phosphonite. Tetrakis(di-tert-butylphenyl)-biphenylene diphosphonites and bis(di-tert-butylphenyl)-phenyl-phenyl phosphonites are preferred, and tetrakis(2,4-di-tert-butylphenyl)-biphenylene diphosphonites and bis(2,4-di-tert-butylphenyl)-phenyl-phenyl phosphonites are more preferred. Preferably, these phosphonite compounds may be used in combination with a phosphite compound having an aryl group substituted by two or more of the above alkyl groups.

Examples of the phosphonate compound include dimethyl benzenephosphonate, diethyl benzenephosphonate and dipropyl benzenephosphonate.

Examples of the tertiary phosphine include triethylphosphine, tripropylphosphine, tributylphosphine, trioctylphosphine, triamylphosphine, dimethylphenylphosphine, dibutylphenylphosphine, diphenylmethylphosphine, diphenyloctylphosphine, triphenylphosphine, tri-p-tolylphosphine, trinaphthylphosphine and diphenylbenzylphosphine. The tertiary phosphine is particularly preferably triphenylphosphine.

These phosphorus-based antioxidants (component G) may be used alone or in combination of two or more. Out of the phosphorus-based antioxidants, a phosphite compound or a phosphonite compound is preferred.

The content of the phosphorus-based antioxidant (component G) is 0.002 to 2.5 parts by weight, preferably 0.004 to 1.5 parts by weight, more preferably 0.005 to 0.5 part by weight based on 100 parts by weight of the thermoplastic polyester resin (component A). When the content is lower than 0.002 part by weight, the effect of improving heat stability and heat deterioration resistance is not obtained and when the content is higher than 2.5 parts by weight, heat stability and heat deterioration resistance degrade disadvantageously. It is needless to say that when heat stability degrades, tensile elongation lowers and flexibility is lost.

When a phenol-based antioxidant (component F) and a phosphorus-based antioxidant (component G) are used in combination, the weight ratio of these components is not particularly limited as long as it falls within the range of the present invention. However, the weight ratio of the phenol-based antioxidant (component F) to the phosphorus-based antioxidant (component G) is preferably 5/1 to 1/5, more preferably 3/1 to 1/3, particularly preferably 2/1 to 1/2. Within this range, the effect of improving heat stability by using a combination of the phenol-based antioxidant (component F) and the phosphorus-based antioxidant (component G) is high.

(Other Additives)

The resin composition for wire coating of the present invention may be mixed with another thermoplastic resin and optionally a plasticizer, an inorganic filler other than the component E, a halogen-free flame retardant, a vulcanizing (crosslinking) agent, a pigment, an optical stabilizer, an antistatic agent, an antiblocking agent, a lubricant, a dispersant, a flowability improving agent, a release agent, a nucleating agent and a neutralizer as long as the effect of the present invention is not impaired. Examples of the other thermoplastic resin include a copolymer containing ethylene, (meth)acrylic acid ester or styrene as the main component. The amount of the additive or the thermoplastic resin is generally 0.01 to 50 parts by weight based on 100 parts by weight of the thermoplastic polyester resin (component A).

(Insulated Wire)

The insulated wire of the present invention includes a conductor and an insulating material coated on the exterior surface of the conductor as constituent elements.

Examples of the conductor include a copper wire, an aluminum wire and a glass fiber wire. The conductor may be a copper wire alone, or twisted wires or knitted wires composed of a plurality of wires. The diameter of the conductor is preferably 0.1 to 2 mm. The conductor may be plated with tin by hot dipping or electrolysis. The cross-sectional shape of the conductor is not only round but also straight angular obtained by slitting a copper plate or rolling a circular wire.

The insulating material is the above-described resin composition of the present invention. The insulating material should be coated on the exterior surface of the conductor. The exterior surface of the conductor may be coated with crosslinked polyethylene and further with the resin composition of the present invention on the exterior side.

The thickness of the coating of the resin composition is preferably 0.01 to 0.5 mm, more preferably 0.02 to 0.4 mm to reduce the weight and thickness of the insulated wire. When the thickness of the insulating material is smaller than 0.01 mm, it is difficult to maintain abrasion resistance and when the thickness is larger than 0.5 mm, the take-up diameter of the insulated wire becomes large, thereby making it difficult to handle it. The insulating material may consist of a single layer or multiple layers. For example, an insulated wire of higher level can be manufactured by forming a two-layer structure and making the content of the polyester block copolymer (component B) or magnesium hydroxide (component C) which deteriorates insulating properties in the inner layer different from that in the outer layer of the two-layer structure.

The insulating material may further have a sheath layer on the surface. The sheath layer is made of vinyl chloride or polyethylene. A plurality of conductors coated with the resin composition of the present invention are twisted, and the outer surface of the twisted assembly may be covered with the sheath layer.

The insulated wire of the present invention comprises as an insulating material a resin composition which is excellent in heat deterioration resistance, abrasion resistance, flame retardancy and insulating properties, can achieve low smoke-producing properties, contains no halogen compound and has a high level of tensile elongation. Therefore, even when the insulated wire is made light in weight and thin, it is excellent in mechanical strength and heat resistance. The insulated wire of the present invention is suitable for use as a wire for vehicles such as automobiles, trains and airplanes.

An example of the method of producing the insulated wire will be explained. A known method may be used to produce the insulated wire. For example, the insulated wire can be manufactured by using a general extrusion molding line to melt knead the resin composition of the present invention and extruding the resin compositor onto a conductor. A batch type kneader or a double-screw extruder may be used for melt kneading. For example, a double-screw extruder is used in the extrusion molding line but a machine other than the double-screw extruder may be used. With this double-screw extruder, the melt kneaded resin composition is extruded by controlling the temperature of the head unit of the double-screw extruder to a predetermined temperature of 240 to 310° C. so as to coat the conductor with the resin composition having an extrusion temperature of 240 to 310° C.

The temperature for extruding the resin composition is preferably set to 240 to 310° C. When the temperature exceeds 310° C., the resin composition partly decomposes or the molecular weight of the thermoplastic resin lowers, whereby bunchy foreign matter may be produced or the abnormality of the outer diameter of the wire may occur.

When the temperature falls below 240° C., the thermoplastic resin is not completely molten, which may result in a bad appearance or an extrusion failure.

EXAMPLES

The following examples are provided for the purpose of further illustrating the present invention but are in no way to be taken as limiting. "Parts" in the following description means "parts by weight", and "%" means "wt %". Physical properties were measured by the following methods.

1. Measurement of Resin Characteristic Properties (1) Measurement of Intrinsic Viscosity (IV)

After 0.6 g of the resin was molten in 50 ml of orthochlorophenol by heating, the resulting resin solution was cooled to room temperature to measure its viscosity at a temperature of 35° C. by using an Ostwald viscosity tube. The intrinsic viscosity (IV) of the resin was calculated from the obtained solution viscosity data.

(2) Measurement of Terminal Carboxyl Group Concentration

This is the equivalent concentration of $1 \times 10^6$ g of a terminal carboxyl group obtained by melting 0.4 g of the resin in 100 ml of benzyl alcohol and titrating the obtained resin solution with 0.1N-NaOH by means of the GT-100 automatic titration apparatus (of Mitsubishi Chemical Corporation).

(3) Measurement of Softening Temperature

The softening temperature was measured at a temperature elevation rate of 20° C./min in a nitrogen atmosphere by means of a differential scanning calorimeter (DSC).

(4) Extrudability

Extrudability was evaluated as ○ (satisfactory) when an additive did not fuse near a feed part for extrusion and a shoot-up did not occur at the time of melt kneading the resin composition and pelletizing it under conditions which will be described hereinafter and as x (extrusion failure) when a shoot-up occurred and extrusion was impossible.

(5) Flexibility and Heat Deterioration Resistance

A composition pellet was molded into a dumbbell test sample (based on JIS K 6251: No. 3) by using an injection molding machine (Mitsubishi Heavy Industries, Ltd.) at a cylinder temperature of 260° C. and a mold temperature of 50° C. The tensile elongation retention after a dry heat treatment was calculated based on the following numerical expression from a tensile elongation measured by using a test sample which was left in a 150° C. hot air drier for 96 hours and then in a 23° C.-50% RH environment for 24 hours (test sample after a dry heat treatment) and a tensile elongation measured by using a test sample which was left in a 23° C.-50% RH environment for 24 hours (test sample before a dry heat treatment). A tensile test was carried out at 5 ram/min.

As for the judgment of flexibility, a test sample having a tensile elongation of 20% before the dry heat treatment was judged as ○ (acceptable) and a test sample having a tensile elongation of less than 20% was judged as x (unacceptable).

As for the judgment of heat deterioration resistance, a test sample having a tensile elongation retention of not less than 80% was judged as ○ (acceptable) and a test sample having a tensile elongation retention of less than 80% was judged as x (unacceptable).

Tensile elongation retention (%)=100×(tensile elongation after dry heat treatment)/(tensile elongation before dry heat treatment)

(6) Abrasion Resistance

The composition pellet obtained by a method which will be described hereinafter was molded into a tensile test sample (thickness of 4 mm, total width of 30 mm, length of 170 mm) by using an injection molding machine (80 MSP-5 of Mitsubishi Heavy Industries, Ltd.) at a cylinder temperature of 260° C. and a mold temperature of 50° C. in accordance with an ISO 527-1 method. An abrasion resistance test was made on the obtained tensile test sample by using a reciprocating dynamic abrasion friction tester (AFT-15M of Orientec Co., Ltd.) in a 23° C.-50% RH atmosphere. This abrasion resistance test was carried out as shown in FIG. 1 by applying the abrasion pin of the steel ball 5Φ of the reciprocating dynamic abrasion friction tester to the test sample 1 from above and applying a load of 3 kg to the test sample so as to press the pin against the test sample. While this load was applied to the test sample, the test sample was caused to reciprocate 200 times at a testing rate of 20 mm/sec and a stroke width of 20 mm in the lengthwise direction so as to measure its dynamic friction coefficient. As the dynamic friction coefficient becomes smaller, abrasion resistance becomes higher. The dynamic friction coefficient needs to be less than 1.

(7) Insulating Properties

The composition pellet obtained by the method which will be described hereinafter was molded into a disk-like test sample (diameter of 50 mm, thickness of 3 mm) at a cylinder temperature of 260° C. and a mold temperature of 50° C. by using an injection molding machine (80 MSP-5 of Mitsubishi Heavy Industries, Ltd.). After this disk-like test sample was treated in 85° C. hot water for 240 hours and lightly wiped with kimwipe, a breakdown test was carried out on this test sample in 23° C. oil by using a breakdown tester in accordance with IEC60243. In this isolating property test, a test sample having a break strength of not less than 40 kV was judged as ○ (acceptable) and a test sample having a break strength of less than 40 kV was judged as x (unacceptable).

(8) Low Smoke-Producing Properties

Figure 2:
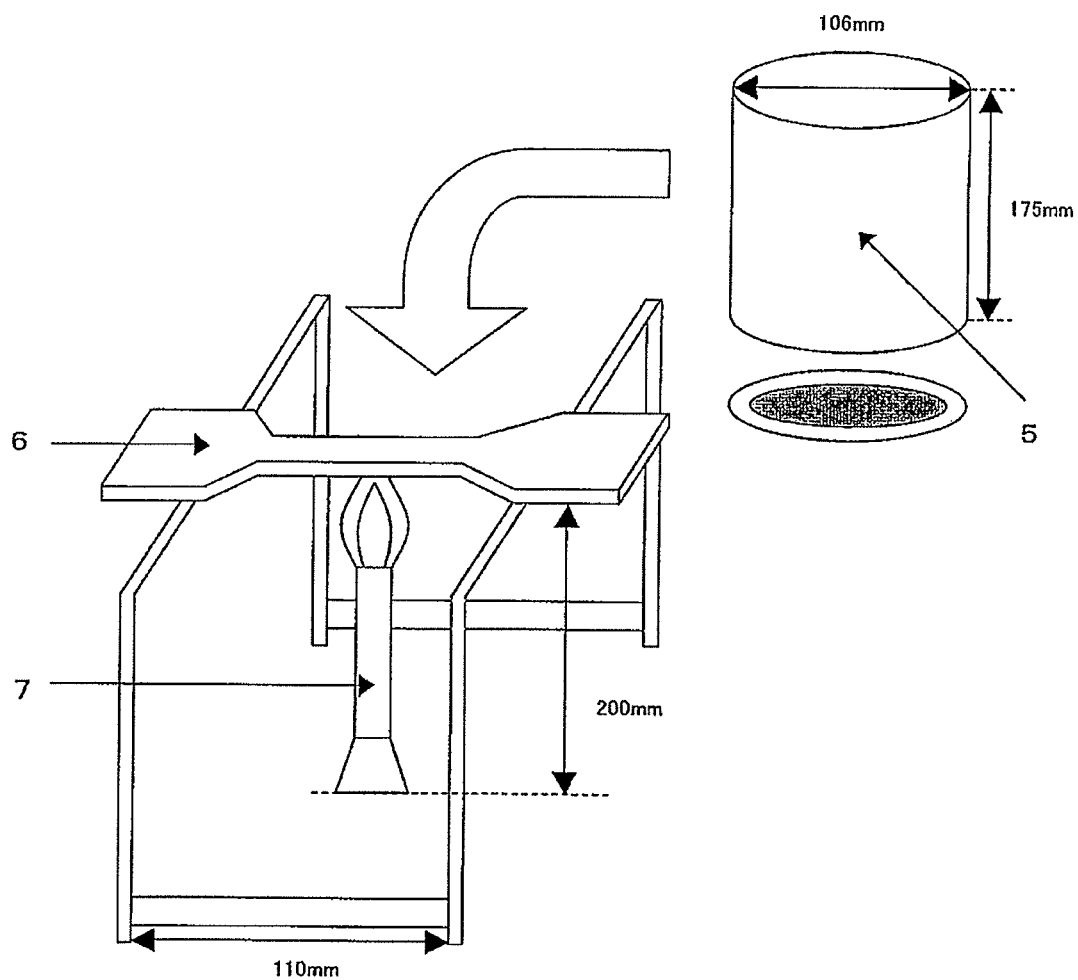
FIG. 2 is a diagram for explaining a flame contact method in a low smoke-producing property test made on a molded article.
Figure 3:
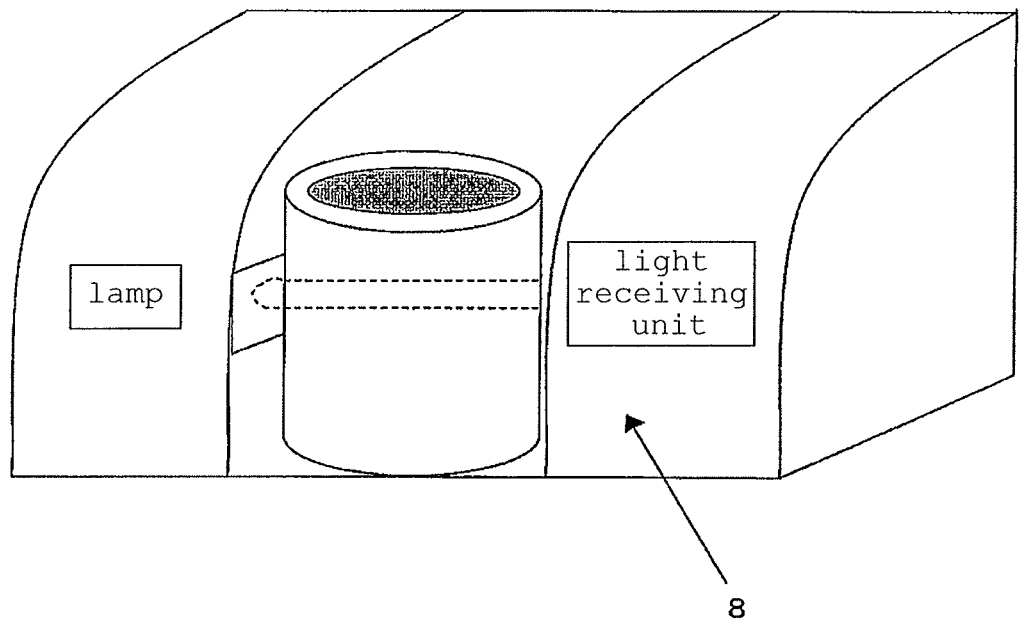
FIG. 3 is a diagram for explaining a measurement method in a low smoke-producing property test made on a molded article.
Figure 4:
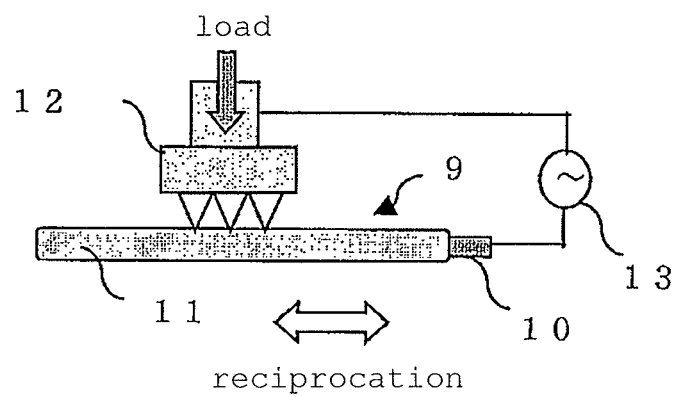
FIG. 4 is a diagram for explaining a method of carrying out an abrasion resistance test on an insulated wire.

The composition pellet obtained by the method which will be described hereinafter was molded into a dumbbell test sample (based on ISO 527: 1A type) at a cylinder temperature of 260° C. and a mold temperature of 50° C. by using an injection molding machine (80 MSP-5 of Mitsubishi Heavy Industries, Ltd.). Flares were applied to the center of the test sample which had been left in a 23° C.-50% RH environment for 24 hours by using a burner (based on UL 5V) for 15 seconds as shown in FIG. 2 and smoke coming from above the sample was collected in a collection bottle (transparent heat-resistance glass bottle having a mouth inner diameter of 99 mm, a barrel diameter of 106 mm and a height of 175 mm). Five minutes after collection, the total light transmittance (%) of the bottle containing smoke was measured with a reflection/transmittance meter (HR-100 of Murakami Color Research Laboratory) (D65 light source)) as shown in FIG. 3. A test sample having a total light transmittance of not less than 80% was evaluated as ○ (acceptable) and a test sample having a total light transmittance of less than 80% was evaluated as x (unacceptable).

2. Measurement of Characteristic Properties of Insulated Wire (1) Tensile Elongation of Insulated Wire (Heat Deterioration Resistance)

A copper wire was extracted from an insulated wire sample produced by the method which will be described hereinafter to produce a tube-like test sample (outer diameter of 1.9 mm, inner diameter of 1.3 mm, length of 150 mm). After the test sample was treated in a 150° C. atmosphere in a gear oven aging tester for 96 hours, a tensile elongation test was conducted. The tensile elongation test was made on the test sample at a tension rate of 200 ram/min in accordance with JIS C 3005. A test sample having a tensile elongation of not less than 200% was evaluated as ○ (acceptable) and a test sample having a tensile elongation of less than 200% was evaluated as x (unacceptable). The tensile elongation is calculated from the following expression.

Tensile elongation (%)=100×[(length of sample after tensile elongation test)−(length of test sample before tensile elongation test)]/(length of sample before tensile elongation test)

(2) Abrasion Resistance of Insulated Wire

An abrasion resistance test was made on an insulated wire produced by the method which will be described hereinafter (coating thickness of insulator of 0.3 mm, length of insulator of about 60 cm) in a normal temperature atmosphere by using an abrasion tester. This abrasion resistance test was carried out by applying the 90° sharp edge 12 of the abrasion tester to an insulated wire 9 from above and applying a load of 2 pounds (907 g) from the 90° sharp edge 12 to press the sharp edge against the insulated wire 9. The insulated wire 9 was reciprocated in the lengthwise direction while this load was applied to the insulated wire 9 to measure the number of reciprocations (cycles) until the insulator 11 of the insulated wire 9 was worn away so that the 90° sharp edge 12 was contacted to a conductor 10 to cause a short circuit. A lamp for detecting a power supply 13 and a short circuit is connected between the conductor 10 of the insulated wire 9 and the 90° sharp edge 12. The number of reciprocations (cycles) until a short circuit occurs is shown. It must be at least 150.

3. Production of PBN

Production Example A-1

Production of PBN (IV=1.1) by Solid-Phase Polymerization 315.0 parts of dimethyl 2,6-naphthalene dicarboxylate, 200.0 parts of 1,4-butanediol and 0.062 part of tetra-n-butyl titanate were injected into a transesterification reactor to carry out a transesterification reaction for 150 minutes while the transesterification reactor was heated up to 210° C. Then, the obtained reaction product was transferred to a polycondensation reactor to start a polycondensation reaction. The polycondensation reaction was carried out by gradually reducing the inside pressure of the polycondensation reactor from normal pressure to 0.13 kPa (1 Torr) or less over 40 minutes and elevating the temperature to a predetermined reaction temperature of 260° C. at the same time and then maintaining the polycondensation reaction temperature at 260° C. and the pressure at 0.13 kPa (1 Torr) for 140 minutes. After the passage of 140 minutes, the polycondensation reaction was terminated and PBN was extracted in the form of a strand and cut into chips with a cutter while it was cooled with water. Then, the solid-phase polymerization of the obtained PBN was carried out at a temperature of 213° C. and a pressure of 0.13 kPa (1 Torr) or less for 8 hours. The intrinsic viscosity and terminal carboxyl group concentration of the obtained PBN (PBN-1) were measured and shown in Table 1.

Production Example A-2

Production of PBN (IV=1.5) by Solid-Phase Polymerization

A transesterification reaction and a polycondensation reaction were carried out in the same manner as in Production Example 1 and then the solid-phase polymerization of the obtained PBN was carried out at 213° C. and a pressure of 0.13 kPa (1 Torr) or less for 15 hours. The intrinsic viscosity and terminal carboxyl group concentration of the obtained PBN (PBN-2) were measured and shown in Table 1.

Production Example A-3

Production of PBN (IV=0.5) by Melt Polymerization

PBN (PBN-3) was obtained by carrying out a transesterification reaction and a polycondensation reaction in the same manner as in Production Example 1 except that solid-phase polymerization was not carried out. The intrinsic viscosity and terminal carboxyl group concentration of the obtained PBN were measured and shown in Table 1.

TABLE 1

| Item | | Unit | Production Example A-1 PBN-1 | Production Example A-2 PBN-2 | Production Example A-3 PBN-3 |
|---|---|---|---|---|---|
| 2,6-naphthalenedicarboxylic acid | | Parts by | 315 | 315 | 315 |
| 1,4-butanediol | | weight | 200 | 200 | 200 |
| Transesterification reaction | Temperature | ° C. | 210 | 210 | 210 |
| | Time | Min | 150 | 150 | 150 |
| Polycondensation reaction | Pressure | kPa | 0.13 | 0.13 | 0.13 |
| | Temperature | ° C. | 260 | 260 | 260 |
| | Time | Min | 140 | 140 | 140 |
| Solid-phase polymerization | Pressure | kPa | 0.13 | 0.13 | — |
| | Temperature | ° C. | 213 | 213 | — |
| | Time | Min | 480 | 900 | 0 |
| IV | | dl/g | 1.1 | 1.5 | 0.5 |
| Terminal carboxyl group concentration | | eq/ton | 16 | 10 | 35 |
| Melting point | | ° C. | 243 | 243 | 243 |

4. Production of Polyester Block Copolymer

Production Example B-1

Production of Polyester Block Copolymer Having an IV of 0.85 and a Melting Point of 213° C.

135.8 parts of dimethyl isophthalate (to be abbreviated as DMI hereinafter) (70 mol % based on 100 wt % of the total of all acid components), 69.6 parts of dimethylsebacic acid (to be abbreviated as DMS hereinafter) (30 mol % based on 100 wt % of the total of all acid components) and 118.0 parts of hexamethylene glycol (to be abbreviated as HMG hereinafter) were subjected to a transesterification reaction and an esterification reaction in the presence of 0.17 part of titanium tetrabutoxide (0.05 part by mole based on 100 parts by mole of the total of all the acid components) as a catalyst, methanol and water were distilled off, and polymerization was carried out at 260° C. under high vacuum by a predetermined method to obtain a polyester B-1-1' having an intrinsic viscosity of 0.89. This polyester was transparent and rarely crystallized even after it was left at a high temperature for one day.

Meanwhile, dimethyl terephthalate (to be abbreviated as DMT hereinafter) and tetramethylene glycol (to be abbreviated as TMG hereinafter) were subjected to a transesterification reaction in the same manner as described above in the presence of titanium tetrabutoxide (0.0440 part by mole based on 100 parts by mole of DMT) as a catalyst, and polymerization was carried out to obtain a polyester B-1-2' having an intrinsic viscosity of 0.91 and a melting point of 225° C.

Then, 30 parts by weight of the polyester B-1-2' was molten at 250° C., 70 parts by weight of the polyester B-1-1' was added to and reacted with the polyester B-1-2' under high vacuum at 250° C. for 1 hour and 10 minutes under agitation, and phosphoric acid (1.5 times larger than the molar amount of titanium) was added when the content became transparent to obtain a polyester block copolymer B-1. The intrinsic viscosity, melting point and terminal carboxyl group concentration of the obtained polyester block copolymer were measured and shown in Table 2.

Production Example B-2

Production of Polyester Block Copolymer Having an IV of 0.92 and a Melting Point of 219° C.

A polyester block copolymer B-2 was obtained in the same manner as in Production Example B-1 except that 50 parts by weight of the polyester B-1-1' and 50 parts by weight of the polyester B-1-2' were used. The intrinsic viscosity, melting point and terminal carboxyl group concentration of the obtained polyester block copolymer B-2 are shown in Table 2.

Production Example B-3

Production of Polyester Block Copolymer Having an IV of 0.82 and a Melting Point of 207° C.

A polyester block copolymer B-3 was obtained in the same manner as in Production Example B-1 except that 80 parts by weight of the polyester B-1-1' and 20 parts by weight of the polyester B-1-2' were used. The intrinsic viscosity, melting point and terminal carboxyl group concentration of the obtained polyester block copolymer B-3 are shown in Table 2.

Production Example B-4

Production of Polyester Block Copolymer Having an IV of 0.79 and a Melting Point of 167° C.

A polyester block copolymer B-4 was obtained in the same manner as in Production Example B-1 except that 95 parts by weight of the polyester B-1-1' and 5 parts by weight of the polyester B-1-2' were used. The intrinsic viscosity, melting point and terminal carboxyl group concentration of the obtained polyester block copolymer B-4 are shown in Table 2.

Production Example B-5

Production of Polyester Block Copolymer Having an IV of 0.63 and a Melting Point of 211° C.

135.8 parts of DMI (70 mol % based on 100 wt % of the total of all acid components), 69.6 parts of DMS (30 mol % based on 100 wt % of the total of all acid components) and 118.0 parts of HMG were subjected to a transesterification reaction and an esterification reaction in the presence of 0.17 part of titanium tetrabutoxide (0.05 part by mole based on 100 parts by mole of the total of all the acid components) as a catalyst, methanol and water were distilled off, and polymerization was carried out at 260° C. under high vacuum by a predetermined method to obtain a polyester B-5-1' having an intrinsic viscosity of 0.64. This polyester was transparent and rarely crystallized even after it was left at a high temperature for one day.

Meanwhile, DMT and TMG were subjected to a transesterification reaction in the same manner as described above in the presence of titanium tetrabutoxide (0.04 part by mole based on 100 parts by mole of DMT) as a catalyst and polymerized to obtain a polyester B-5-2' having an intrinsic viscosity of 0.66 and a melting point of 223° C.

Then, 30 parts by weight of the polyester B-5-2' was molten at 250° C., 70 parts by weight of the polyester B-5-1' was added to and reacted with the polyester B-5-2' under a high vacuum of 0.13 kPa (1 Torr) at 250° C. for 1 hour and 10 minutes under agitation, and phosphoric acid (1.5 times larger than the molar amount of titanium) was added when the content became transparent to obtain a polyester block copolymer B-5. The intrinsic viscosity, melting point and terminal carboxyl group concentration of the obtained polyester block copolymer are shown in Table 2.

Production Example B-6

Production of Polyester Block Copolymer Having an IV of 1.04 and a Melting Point of 214° C.

135.8 parts of DMI (70 mol % based on 100 wt % of the total of all acid components), 69.6 parts of DMS (30 mol % based on 100 wt % of the total of all acid components) and 118.0 parts of HMG were subjected to a transesterification reaction and an esterification reaction in the presence of 0.17 part of titanium tetrabutoxide (0.05 part by mole based on 100 parts by mole of the total of all the acid components) as a catalyst, methanol and water were distilled off, and polymerization was carried out at 260° C. under high vacuum by a predetermined method to obtain a polyester B-6-1' having an intrinsic viscosity of 1.04. This polyester was transparent and rarely crystallized even after it was left at a high temperature for one day.

Meanwhile, DMT and TMG were subjected to a transesterification reaction in the same manner as described above in the presence of titanium tetrabutoxide (0.04 part by mole based on 100 parts by mole of DMT) as a catalyst and polymerized to obtain a polyester B-6-2' having an intrinsic viscosity of 1.04 and a melting point of 225° C.

Then, 30 parts by weight of the polyester B-6-2' was molten at 250° C., 70 parts by weight of the polyester B-6-1' was added to and reacted with the polyester B-6-2' under high vacuum at 250° C. for 1 hour and 10 minutes under agitation, and phosphoric acid (1.5 times larger than the molar amount of titanium) was added when the content became transparent to obtain a polyester block copolymer B-6. The intrinsic viscosity, melting point and terminal carboxyl group concentration of the obtained polyester block copolymer are shown in Table 2.

Production Example B-7

Production of Polyester Block Copolymer Having an IV of 0.45 and a Melting Point of 193° C.

A polyester block copolymer B-7 was obtained in the same manner as in Production Example B-5 except that the polyester B-5-2' and the polyester B-5-1' were reacted with each other under agitation for 1 hour and 40 minutes. The intrinsic viscosity, melting point and terminal carboxyl group concentration of the obtained polyester block copolymer B-7 are shown in Table 2.

Production Example B-8

Production of Polyester Block Copolymer Having an IV of 0.67 and a Melting Point of 185° C.

A polyester block copolymer B-8 was obtained in the same manner as in Production Example B-6 except that the polyester B-6-2' and the polyester B-6-1' were reacted with each other at 290° C. under agitation. The intrinsic viscosity, melting point and terminal carboxyl group concentration of the obtained polyester block copolymer B-8 are shown in Table 2.

Production Example B-9

Production of Polyester Block Copolymer Having an IV of 0.89 and a Melting Point of 217° C.

164.9 parts of DMI (85 mol % based on 100 wt % of the total of all acid components), 34.8 parts of DMS (15 mol % based on 100 wt % of the total of all acid components) and 118.0 parts of HMG were subjected to a transesterification reaction and an esterification reaction in the presence of 0.17 part of titanium tetrabutoxide (0.05 part by mole based on 100 parts by mole of the total of all the acid components) as a catalyst, methanol and water were distilled off, and polymerization was carried out at 260° C. under high vacuum by a predetermined method to obtain a polyester B-9-1' having an intrinsic viscosity of 0.91. This polyester was transparent and rarely crystallized even after it was left at a high temperature for one day.

Then, 30 parts by weight of the polyester B-1-2' was molten at 250° C., 70 parts by weight of the polyester B-9-1' was added to and reacted with the polyester B-1-2' under high vacuum at 250° C. for 1 hour and 10 minutes' under agitation, and phosphoric acid (1.5 times larger than the molar amount of titanium) was added when the content became transparent to obtain a polyester block copolymer B-9. The intrinsic viscosity, melting point and terminal carboxyl group concentration of the obtained polyester block copolymer were measured and shown in Table 2.

Production Example B-10

Production of Polyester Block Copolymer Having an IV of 0.89 and a Melting Point of 211° C.

97.0 parts of DMI (50 mol % based on 100 wt % of the total of all acid components), 116.0 parts of DMS (50 mol % based on 100 wt % of the total of all acid components) and 118.0 parts of HMG were subjected to a transesterification reaction and an esterification reaction in the presence of 0.17 part of titanium tetrabutoxide (0.05 part by mole based on 100 parts by mole of the total of all the acid components) as a catalyst, methanol and water were distilled off, and polymerization was carried out at 260° C. under high vacuum by a predetermined method to obtain a polyester B-10-1' having an intrinsic viscosity of 0.91. This polyester was transparent and rarely crystallized even after it was left at a high temperature for one day.

Then, 30 parts by weight of the polyester B-1-2' was molten at 250° C., 70 parts by weight of the polyester B-10-1' was added to and reacted with the polyester B-1-2' under a high vacuum of 0.13 kPa (1 Torr) at 250° C. for 1 hour and 10 minutes under agitation, and phosphoric acid (1.5 times larger than the molar amount of titanium) was added when the content became transparent to obtain a polyester block copolymer B-10. The intrinsic viscosity, melting point and terminal carboxyl group concentration of the obtained polyester block copolymer were measured and shown in Table 2.

Production Example B-11

Production of Polyester Block Copolymer Having an IV of 0.90 and a Melting Point of 220° C.

184.3 parts of DMI (95 mol % based on 100 wt % of the total of all acid components), 11.6 parts of DMS (5 mol % based on 100 wt % of the total of all acid components) and 118.0 parts of HMG were subjected to a transesterification reaction and an esterification reaction in the presence of 0.17 part of titanium tetrabutoxide (0.05 part by mole based on 100 parts by mole of the total of all the acid components) as a catalyst, methanol and water were distilled off, and polymerization was carried out at 260° C. under high vacuum by a predetermined method to obtain a polyester B-11-1' having an intrinsic viscosity of 0.90. This polyester was transparent and rarely crystallized even after it was left at a high temperature for one day.

Then, 30 parts by weight of the polyester B-1-2' was molten at 250° C., 70 parts by weight of the polyester B-11-1' was added to and reacted with the polyester B-1-2' under a high vacuum of 0.13 kPa (1 Torr) at 250° C. for 1 hour and 10 minutes under agitation, and phosphoric acid (1.5 times larger than the molar amount of titanium) was added when the content became transparent to obtain a polyester block copolymer B-11. The intrinsic viscosity, melting point and terminal carboxyl group concentration of the obtained polyester block copolymer were measured and shown in Table 2.

Production Example B-12

Production of Polyester Block Copolymer Having an IV of 1.27 and a Melting Point of 222° C.

184.3 parts of DMI (95 mol % based on 100 wt % of the total of all acid components), 11.6 parts of DMS (5 mol % based on 100 wt % of the total of all acid components) and 118.0 parts of HMG were subjected to a transesterification reaction and an esterification reaction in the presence of 0.17 part of titanium tetrabutoxide (0.05 part by mole based on 100 parts by mole of the total of all the acid components) as a catalyst, methanol and water were distilled off, and polymerization was carried out at 260° C. under high vacuum by a predetermined method to obtain a polyester B-12-1' having an intrinsic viscosity of 1.32. This polyester was transparent and rarely crystallized even after it was left at a high temperature for one day.

Meanwhile, DMT and TMG were subjected to a transesterification reaction in the presence of titanium tetrabutoxide (0.04 part by mole based on 100 parts by mole of DMT) as a catalyst and then polymerized in the same manner as described above to obtain a polyester B-12-2' having an intrinsic viscosity of 1.31 and a melting point of 227° C.

Then, 30 parts by weight of the polyester B-12-2' was molten at 250° C., 70 parts by weight of the polyester B-12-1' was added to and reacted with the polyester B-12-2' under a high vacuum of 0.13 kPa (1 Torr) at 250° C. for 1 hour and 10 minutes under agitation, and phosphoric acid (1.5 times larger than the molar amount of titanium) was added when the content became transparent to obtain a polyester block copolymer B-12. The intrinsic viscosity, melting point and terminal carboxyl group concentration of the obtained polyester block copolymer were measured and shown in Table 2.

Production Example B-13

Production of Polyester Block Copolymer Having an IV of 1.18 and a Melting Point of 231° C.

DMT and TMG were subjected to a transesterification reaction in the presence of titanium tetrabutoxide (0.04 part by mole based on 100 parts by mole of DMT) as a catalyst and then polymerized in the same manner as described above to obtain a polyester B-13-2' having an intrinsic viscosity of 1.67 and a melting point of 234° C.

Then, 50 parts by weight of the polyester B-13-2' was molten at 250° C., 50 parts by weight of the polyester B-1-1' was added to and reacted with the polyester B-13-2' under a high vacuum of 0.13 kPa (1 Torr) at 250° C. for 10 minutes under agitation, and phosphoric acid (1.5 times larger than the molar amount of titanium) was added when the content became transparent to obtain a polyester block copolymer B-13. The intrinsic viscosity, melting point and terminal carboxyl group concentration of the obtained polyester block copolymer were measured and shown in Table 2.

Production Example B-14

Production of Polyester Block Copolymer Having an IV of 0.93 and a Melting Point of 221° C.

60 parts by weight of the polyester B-1-2' was molten at 250° C., 40 parts by weight of the polyester B-1-1' was added to and reacted with the polyester B-1-2' under a high vacuum of 0.13 kPa (1 Torr) at 250° C. for 10 minutes under agitation, and phosphoric acid (1.5 times larger than the molar amount of titanium) was added when the content became transparent to obtain a polyester block copolymer B-14. The intrinsic viscosity, melting point and terminal carboxyl group concentration of the obtained polyester block copolymer were measured and shown in Table 2.

TABLE 2

| | | | Production Example | | | | | | |
|---|---|---|---|---|---|---|---|---|---|
| | | | B-1 | B-2 | B-3 | B-4 | B-5 | B-6 | B-7 |
| Polyester for soft segment | Name | unit | B-1-1' | | | | B-5-1' | B-6-1' | B-5-1' |
| | DMI | parts | 70 | 70 | 70 | 70 | 70 | 70 | 70 |
| | DMS | by mol | 30 | 30 | 30 | 30 | 30 | 30 | 30 |
| | HMG | mol | 100 | 100 | 100 | 100 | 100 | 100 | 100 |
| | IV | dl/g | 0.89 | 0.89 | 0.89 | 0.89 | 0.64 | 1.04 | 0.64 |
| Polyester for hard segment | Name | unit | B-1-2' | | | | B-5-2' | B-6-2' | B-5-2' |
| | DMT | parts | 100 | 100 | 100 | 100 | 100 | 100 | 100 |
| | TMG | by mol | 100 | 100 | 100 | 100 | 100 | 100 | 100 |
| | IV | dl/g | 0.91 | 0.91 | 0.91 | 0.91 | 0.66 | 1.03 | 0.66 |
| | Melting point 1 | ° C. | 225 | 225 | 225 | 218 | 223 | 225 | 223 |
| Polyester block copolymer | Polyester for soft segment Component B-1 | Parts by weight | 70 | 50 | 80 | 95 | 70 | 70 | 70 |
| | Polyester for hard segment Component B-2 | | 30 | 50 | 20 | 5 | 30 | 30 | 30 |
| | Trans-esterification reaction | Pressure kPa | 0.13 | 0.13 | 0.13 | 0.13 | 0.13 | 0.13 | 0.13 |
| | | Temperature ° C. | 250 | 250 | 250 | 250 | 250 | 250 | 250 |
| | | Time min | 70 | 70 | 70 | 70 | 70 | 70 | 100 |
| | IV | dl/g | 0.85 | 0.92 | 0.82 | 0.79 | 0.63 | 1.04 | 0.45 |
| | Terminal carboxyl group concentration | eq/ton | 13 | 13 | 14 | 13 | 13 | 12 | 35 |
| | Melting point 2 | ° C. | 213 | 219 | 207 | 167 | 211 | 214 | 193 |
| | ΔMelting point (melting point 1 − melting point 2) | ° C. | 12 | 6 | 18 | 51 | 12 | 11 | 30 |

| | | | Production Example | | | | | | |
|---|---|---|---|---|---|---|---|---|---|
| | | | B-8 | B-9 | B-10 | B-11 | B-12 | B-13 | B-14 |
| Polyester for soft | Name | unit | B-6-1' | B-9-1' | B-10-1' | B-11-1' | B-12-1' | B-1-1' | B-1-1' |
| | DMI | parts | 70 | 85 | 50 | 95 | 70 | 70 | 70 |

TABLE 2-continued

| segment | DMS | by mol | 30 | 15 | 50 | 5 | 30 | 30 | 30 |
|---|---|---|---|---|---|---|---|---|---|
| | HMG | mol | 100 | 100 | 100 | 100 | 100 | 100 | 100 |
| | IV | dl/g | 1.04 | 0.91 | 0.91 | 0.9 | 1.32 | 0.89 | 0.89 |
| Polyester for hard segment | Name | unit | B-6-2' | B-1-2' | B-1-2' | B-1-2' | B-12-2' | B-13-2' | B-1-2' |
| | DMT | parts | 100 | 100 | 100 | 100 | 100 | 100 | 100 |
| | TMG | by mol | 100 | 100 | 100 | 100 | 100 | 100 | 100 |
| | IV | dl/g | 1.03 | 0.91 | 0.91 | 0.91 | 1.31 | 1.67 | 0.91 |
| | Melting point 1 | ° C. | 225 | 225 | 225 | 218 | 227 | 234 | 225 |
| Polyester block copolymer | Polyester for soft segment Component B-1 | Parts by weight | 70 | 70 | 70 | 70 | 70 | 50 | 40 |
| | Polyester for hard segment Component B-2 | | 30 | 30 | 30 | 30 | 50 | 50 | 60 |
| | Trans-Esterification reaction | Pressure | kPa | 0.13 | 0.13 | 0.13 | 0.13 | 0.13 | 0.13 | 0.13 |
| | | Temperature | ° C. | 290 | 250 | 250 | 250 | 250 | 250 | 250 |
| | | Time | min | 70 | 70 | 70 | 70 | 70 | 10 | 70 |
| | IV | dl/g | 0.67 | 0.89 | 0.89 | 0.9 | 1.27 | 1.18 | 0.93 |
| | Terminal carboxyl group concentration | eq/ton | 54 | 14 | 14 | 14 | 11 | 10 | 13 |
| | Melting point 2 | ° C. | 183 | 217 | 211 | 220 | 222 | 231 | 221 |
| | ΔMelting point (melting point 1 − melting point 2) | ° C. | 42 | 8 | 14 | 5 | 5 | 3 | 4 |

Examples are given below.

Compositions were mixed in a ratio shown in Tables 3 to 5, each of the resulting mixtures was melt kneaded by means of a double-screw extruder at 280 to 290° C., and the obtained kneaded product was ground to a size as large as a rice grain, pelletized and dried with a hot air drier at 140° C. for 6 hours. Then, the resin composition obtained by the above step was extrusion molded onto the surface of a tin plated soft copper wire having a diameter of 1.3 mm to a coating thickness of 0.3 mm. A dice having a diameter of 4.2 mm and a nipple having a diameter of 2.0 mm were used for extrusion molding, the extrusion rate was 5 m/min, the extrusion temperature of a cylinder was 270 to 290° C., and the extrusion temperature of a head was 280 to 290° C. The characteristic properties of the formed thermoplastic polyester resin, thermoplastic polyester resin composition, molded article and insulated wire were evaluated by the above methods. The results are shown in Tables 3 to 5.

Components used are given below.
(Component A: Thermoplastic Polyester Resin)
(component A-1: polybutylene naphthalene dicarboxylate Resin)
PBN-1: polybutylene naphthalene dicarboxylate resin (Production Example A-1)
PBN-2: polybutylene naphthalene dicarboxylate resin (Production Example A-2)
PBN-3: polybutylene naphthalene dicarboxylate resin (Production Example A-3)
(Component A-2: Polybutylene Terephthalate Resin)
PBT-1: manufactured by Polyplastics Co., Ltd., trade name: 300 FP (IV of 0.69 dl/g, terminal carboxyl group concentration of 20 eq/ton)
(component B: polyester block copolymer)
B-1: Polyester Block Copolymer (Production Example B-1)
B-2: polyester block copolymer (Production Example B-2)
B-3: polyester block copolymer (Production Example B-3)
B-4: polyester block copolymer (Production Example B-4)
B-5: polyester block copolymer (Production Example B-5)
B-6: polyester block copolymer (Production Example B-6)
B-7: polyester block copolymer (Production Example B-7)
B-8: polyester block copolymer (Production Example B-8)
B-9: polyester block copolymer (Production Example B-9)
B-10: polyester block copolymer (Production Example B-10)
B-11: polyester block copolymer (Production Example B-11)
B-12: polyester block copolymer (Production Example B-12)
B-13: polyester block copolymer (Production Example B-13)
B-14: polyester block copolymer (Production Example B-14)
(component C: polycarbodiimide compound)
C-1: manufactured by Nisshinbo Industries, Inc., trade name: HMV-8CA (softening temperature of 71° C.)
C-2: manufactured by Rhein Chemie GmbH, trade name: Stabaxol I (softening temperature of 40° C.)
(component D: magnesium hydroxide)
D-1: manufactured by Kyowa Chemical Industry, Co., Ltd., trade name: Kisuma 5L (average particle diameter of 0.82 µm, specific surface area of 5.6 m$^2$/g, treated with a silane-based coupling agent)
D-2: manufactured by Konoshima Chemical Co., Ltd., trade name: Magseeds EP-1A (average particle diameter of 3.0 µm, specific surface area of 3.4 m$^2$/g, inorganically treated)
(component E: inorganic porous filler)
E-1: manufactured by BASF, trade name: Translink 77 (average particle diameter of 0.8 µm, specific surface area of 16.3 m$^2$/g)
E-2: manufactured by BASF, trade name: Satintone SP-33 (average particle diameter of 1.3 µm, specific surface area of 12.9 m$^2$/g)
(component F: hindered phenol-based antioxidant)
F-1: IRGANOX1076 of Ciba Specialty Chemicals Inc.
(component G: phosphorus-based antioxidant)
G-1: ADK Stab PEP-24G of ADEKA Corporation

TABLE 3

| | | Unit | Ex. 1 | C.Ex. 1 | C.Ex. 2 | Ex. 2 | C.Ex. 3 | Ex. 3 | C.Ex. 4 |
|---|---|---|---|---|---|---|---|---|---|
| Component A | PBN-1 | Parts by weight | 100 | | | 50 | | 100 | 100 |
| | PBN-2 | | | 100 | | | | | |
| | PBN-3 | | | | 100 | | 1 | | |
| | PBT-1 | | | | | 50 | 99 | | |
| Component B | B-1 | | 90 | 90 | 90 | 90 | 90 | 50 | 30 |
| | B-2 | | | | | | | | |
| | B-3 | | | | | | | | |
| | B-4 | | | | | | | | |
| | B-5 | | | | | | | | |
| | B-6 | | | | | | | | |
| | B-7 | | | | | | | | |
| | B-8 | | | | | | | | |
| | B-9 | | | | | | | | |
| | B-10 | | | | | | | | |
| | B-11 | | | | | | | | |
| | B-12 | | | | | | | | |
| | B-13 | | | | | | | | |
| | B-14 | | | | | | | | |
| Component C | C-1 | | 7 | 7 | 7 | 7 | 7 | 7 | 7 |
| | C-2 | | | | | | | | |

| | | Unit | Ex. 4 | C.Ex. 5 | C.Ex. 6 | C.Ex. 7 | C.Ex. 8 | C.Ex. 9 | Ex. 5 |
|---|---|---|---|---|---|---|---|---|---|
| Component A | PBN-1 | Parts by weight | 100 | 100 | 100 | 100 | 100 | 100 | 100 |
| | PBN-2 | | | | | | | | |
| | PBN-3 | | | | | | | | |
| | PBT-1 | | | | | | | | |
| Component B | B-1 | | 140 | 160 | 100 | 100 | 100 | 100 | |
| | B-2 | | | | | | | | 100 |
| | B-3 | | | | | | | | |
| | B-4 | | | | | | | | |
| | B-5 | | | | | | | | |
| | B-6 | | | | | | | | |
| | B-7 | | | | | | | | |
| | B-8 | | | | | | | | |
| | B-9 | | | | | | | | |
| | B-10 | | | | | | | | |
| | B-11 | | | | | | | | |
| | B-12 | | | | | | | | |
| | B-13 | | | | | | | | |
| | B-14 | | | | | | | | |
| Component C | C-1 | | 7 | 7 | | 7 | 7 | 7 | 7 |
| | C-2 | | | | 7 | | | | |

| | | | Unit | Ex. 1 | C.Ex. 1 | C.Ex. 2 | Ex. 2 | C.Ex. 3 | Ex. 3 | C.Ex. 4 |
|---|---|---|---|---|---|---|---|---|---|---|
| | Component D | | D-1 | parts by weight | 40 | 40 | 40 | 40 | 40 | 40 | 40 |
| | | | D-2 | | | | | | | | |
| | Component E | | E-1 | | 2 | 2 | 2 | 2 | 2 | 2 | 2 |
| | | | E-2 | | | | | | | | |
| | Component F | | F-1 | | 0.1 | 0.1 | 0.1 | 0.1 | 0.1 | 0.1 | 0.1 |
| | Component G | | G-1 | | 0.1 | 0.1 | 0.1 | 0.1 | 0.1 | 0.1 | 0.1 |
| Characteristic properties of resin | Extrudability | Shoot-up | — | ○ | ○ | ○ | ○ | ○ | ○ | ○ |
| | | Torque-over | — | ○ | X | ○ | ○ | ○ | ○ | ○ |
| | Flexibility | Tensile elongation | % | 35 | — | 18 | 31 | 24 | 22 | 13 |
| | | Evaluation | — | ○ | — | X | ○ | ○ | ○ | X |
| | Heat deterioration resistance | Evaluation | — | ○ | — | X | ○ | X | ○ | ○ |
| | Abrasion resistance | Dynamic friction coefficient | — | 0.75 | — | 0.83 | 0.98 | 1.93 | 0.59 | 0.52 |
| | Insulation properties | Evaluation | — | ○ | — | ○ | ○ | ○ | ○ | ○ |
| | Low smoke-producing properties | Evaluation | — | ○ | — | ○ | ○ | ○ | ○ | ○ |
| Characteristic properties of wire | Heat deterioration resistance | Evaluation | — | ○ | — | X | ○ | X | ○ | Wire could not be produced |
| | Abrasion resistance | Evaluation | — | ○ | — | ○ | ○ | X | ○ | |

TABLE 3-continued

|  |  | Unit | Ex. 4 | C.Ex. 5 | C.Ex. 6 | Ex. 7 | C.Ex. 8 | Ex. 9 | C.Ex. 5 |
|---|---|---|---|---|---|---|---|---|---|
| Component D | D-1 | parts by weight | 40 | 40 | 40 |  | 40 | 40 | 40 |
|  | D-2 |  |  |  |  | 40 |  |  |  |
| Component E | E-1 |  | 2 | 2 | 2 | 2 |  | 2 | 2 |
|  | E-2 |  |  |  |  |  | 2 |  |  |
| Component F | F-1 |  | 0.1 | 0.1 | 0.1 | 0.1 | 0.1 |  | 0.1 |
| Component G | G-1 |  | 0.1 | 0.1 | 0.1 | 0.1 | 0.1 |  | 0.1 |
| Characteristic properties of resin | Extrudability | Shoot-up | ○ | ○ | X | ○ | ○ | ○ | ○ |
|  |  | Torque-over | ○ | ○ | ○ | ○ | ○ | ○ | ○ |
|  | Flexibility | Tensile elongation % | 47 | 53 | — | 33 | 31 | 29 | 28 |
|  |  | Evaluation | ○ | ○ | — | ○ | ○ | ○ | ○ |
|  | Heat deterioration resistance | Evaluation | ○ | ○ | — | ○ | ○ | X | ○ |
|  | Abrasion resistance | Dynamic friction coefficient | 0.92 | 1.74 | — | 0.79 | 0.74 | 0.75 | 0.72 |
|  | Insulation properties | Evaluation | ○ | ○ | — | X | X | ○ | ○ |
|  | Low smoke-producing properties | Evaluation | ○ | ○ | — | ○ | ○ | ○ | ○ |
| Characteristic properties of wire | Heat deterioration resistance | Evaluation | ○ | ○ | — | ○ | ○ | X | ○ |
|  | Abrasion resistance | Evaluation | ○ | X | — | X | X | ○ | ○ |

Ex.: Example
C.Ex.: Comparative Example

TABLE 4

|  |  | Unit | Ex. 6 | C.Ex. 10 | Ex. 7 | Ex. 8 | C.Ex. 11 | C.Ex. 12 | Ex. 9 |
|---|---|---|---|---|---|---|---|---|---|
| Component A | PBN-1 | Parts by weight | 100 | 100 | 100 | 100 | 100 | 100 | 100 |
|  | PBN-2 |  |  |  |  |  |  |  |  |
|  | PBN-3 |  |  |  |  |  |  |  |  |
|  | PBT-1 |  |  |  |  |  |  |  |  |
| Component B | B-1 |  |  |  |  |  |  |  |  |
|  | B-2 |  |  |  |  |  |  |  |  |
|  | B-3 |  |  | 100 |  |  |  |  |  |
|  | B-4 |  |  |  | 100 |  |  |  |  |
|  | B-5 |  |  |  |  | 100 |  |  |  |
|  | B-6 |  |  |  |  |  | 100 |  |  |
|  | B-7 |  |  |  |  |  |  | 100 |  |
|  | B-8 |  |  |  |  |  |  | 100 |  |
|  | B-9 |  |  |  |  |  |  |  | 100 |
|  | B-10 |  |  |  |  |  |  |  |  |
|  | B-11 |  |  |  |  |  |  |  |  |
|  | B-12 |  |  |  |  |  |  |  |  |
|  | B-13 |  |  |  |  |  |  |  |  |
|  | B-14 |  |  |  |  |  |  |  |  |
| Component C | C-1 |  | 7 | 7 | 7 | 7 | 7 | 7 | 7 |
|  | C-2 |  |  |  |  |  |  |  |  |

|  |  | Unit | C.Ex. 13 | C.Ex. 14 | C.Ex. 15 | C.Ex. 16 | C.Ex. 17 | C.Ex. 18 | C.Ex. 19 |
|---|---|---|---|---|---|---|---|---|---|
| Component A | PBN-1 | Parts by weight | 100 | 100 | 100 | 100 | 100 | 100 | 100 |
|  | PBN-2 |  |  |  |  |  |  |  |  |
|  | PBN-3 |  |  |  |  |  |  |  |  |
|  | PBT-1 |  |  |  |  |  |  |  |  |
| Component B | B-1 |  |  |  | 90 | 90 |  |  |  |
|  | B-2 |  |  |  |  |  |  |  |  |
|  | B-3 |  |  |  |  |  |  |  |  |
|  | B-4 |  |  |  |  |  |  |  |  |
|  | B-5 |  |  |  |  |  |  |  |  |
|  | B-6 |  |  |  |  |  |  |  |  |
|  | B-7 |  |  |  |  |  |  |  |  |
|  | B-8 |  |  |  |  |  |  |  |  |
|  | B-9 |  |  |  |  |  |  |  |  |
|  | B-10 |  |  | 100 |  |  |  |  |  |

TABLE 4-continued

|  |  |  |  |  |  |  |  |  |
|---|---|---|---|---|---|---|---|---|
|  | B-11 |  |  | 100 |  |  |  |  |  |  |
|  | B-12 |  |  |  |  |  | 100 |  |  |  |
|  | B-13 |  |  |  |  |  |  | 100 |  |  |
|  | B-14 |  |  |  |  |  |  |  | 100 |  |
| Component C | C-1 |  | 7 | 7 | 7 | 7 | 7 | 7 | 7 |
|  | C-2 |  |  |  |  |  |  |  |  |

|  |  |  | Unit | Ex. 6 | C.Ex. 10 | Ex. 7 | Ex. 8 | C.Ex. 11 | C.Ex. 12 | Ex. 9 |
|---|---|---|---|---|---|---|---|---|---|---|
| Component D | D-1 | Parts by weight | 40 | 40 | 40 | 40 | 40 | 40 | 40 |
|  | D-2 |  |  |  |  |  |  |  |  |
| Component E | E-1 |  | 2 | 2 | 2 | 2 | 2 | 2 | 2 |
|  | E-2 |  |  |  |  |  |  |  |  |
| Component F | F-1 |  | 0.1 | 0.1 | 0.1 | 0.1 | 0.1 | 0.1 | 0.1 |
| Component G | G-1 |  | 0.1 | 0.1 | 0.1 | 0.1 | 0.1 | 0.1 | 0.1 |
| Characteristic properties of resin | Extrudability | Shoot-up | — | ○ | ○ | ○ | ○ | ○ | ○ | ○ |
|  |  | Torque-over | — | ○ | ○ | ○ | ○ | ○ | ○ | ○ |
|  | Flexibility | Tensile elongation | % | 42 | 48 | 29 | 40 | 13 | 24 | 26 |
|  |  | Evaluation | — | ○ | ○ | ○ | ○ | X | ○ | ○ |
|  | Heat deterioration resistance | Evaluation | — | ○ | X | ○ | ○ | X | X | ○ |
|  | Abrasion resistance | Dynamic friction coefficient | — | 0.86 | 1.68 | 0.91 | 0.68 | 0.96 | 0.75 | 0.69 |
|  | Insulation properties | Evaluation | — | ○ | ○ | ○ | ○ | ○ | ○ | ○ |
|  | Low smoke-producing properties | Evaluation | — | ○ | ○ | ○ | ○ | ○ | ○ | ○ |
| Characteristic properties of wire | Heat deterioration resistance | Evaluation | — | ○ | X | ○ | ○ | Wire could not be produced | X | ○ |
|  | Abrasion resistance | Evaluation | — | ○ | X | ○ | ○ |  | ○ | ○ |

|  |  |  | Unit | C.Ex. 13 | C.Ex. 14 | C.Ex. 15 | C.Ex. 16 | C.Ex. 17 | C.Ex. 18 | C.Ex. 19 |
|---|---|---|---|---|---|---|---|---|---|---|
| Component D | D-1 | Parts by weight | 40 | 40 |  | 40 | 40 | 40 | 40 |
|  | D-2 |  |  |  |  |  |  |  |  |
| Component E | E-1 |  | 2 | 2 | 2 |  | 2 | 2 | 2 |
|  | E-2 |  |  |  |  |  |  |  |  |
| Component F | F-1 |  | 0.1 | 0.1 | 0.1 | 0.1 | 0.1 | 0.1 | 0.1 |
| Component G | G-1 |  | 0.1 | 0.1 | 0.1 | 0.1 | 0.1 | 0.1 | 0.1 |
| Characteristic properties of resin | Extrudability | Shoot-up | — | ○ | ○ | ○ | ○ | ○ | ○ | ○ |
|  |  | Torque-over | — | ○ | ○ | ○ | ○ | ○ | ○ | ○ |
|  | Flexibility | Tensile elongation | % | 42 | 16 | 89 | 36 | 36 | 32 | 15 |
|  |  | Evaluation | — | ○ | X | ○ | ○ | ○ | ○ | X |
|  | Heat deterioration resistance | Evaluation | — | X | ○ | ○ | ○ | X | X | ○ |
|  | Abrasion resistance | Dynamic friction coefficient | — | 0.84 | 0.61 | 0.87 | 0.87 | 0.65 | 0.70 | 0.68 |
|  | Insulation properties | Evaluation | — | ○ | ○ | ○ | ○ | ○ | ○ | ○ |
|  | Low smoke-producing properties | Evaluation | — | ○ | ○ | X | X | ○ | ○ | ○ |
| Characteristic properties of wire | Heat deterioration resistance | Evaluation | — | X | Wire could not be produced | ○ | ○ | X | X | Wire could not be produced |
|  | Abrasion resistance | Evaluation | — | ○ |  | ○ | ○ | ○ | ○ |  |

Ex.: Example
C.Ex.: Comparative Example

TABLE 5

| | | Unit | Ex. 10 | C.Ex. 20 | C.Ex. 21 | Ex. 11 | C.Ex. 22 | C.Ex. 23 | Ex. 12 |
|---|---|---|---|---|---|---|---|---|---|
| Component A | PBN-1 | Parts by weight | 100 | 100 | 100 | 100 | 100 | 100 | 100 |
| | PBN-2 | | | | | | | | |
| | PBN-3 | | | | | | | | |
| | PBT-1 | | | | | | | | |
| Component B | B-1 | | 90 | 90 | 90 | 90 | 90 | 90 | 90 |
| | B-2 | | | | | | | | |
| | B-3 | | | | | | | | |
| | B-4 | | | | | | | | |
| | B-5 | | | | | | | | |
| | B-6 | | | | | | | | |
| | B-7 | | | | | | | | |
| | B-8 | | | | | | | | |
| | B-9 | | | | | | | | |
| | B-10 | | | | | | | | |
| | B-11 | | | | | | | | |
| | B-12 | | | | | | | | |
| | B-13 | | | | | | | | |
| | B-14 | | | | | | | | |
| Component C | C-1 | | 0.2 | 15 | 0.01 | 7 | 7 | 7 | 7 |
| | C-2 | | | | | | | | |

| | | Unit | C.Ex. 24 | Ex. 13 | C.Ex. 25 | C.Ex. 26 | Ex. 14 | C.Ex. 27 | C.Ex. 28 |
|---|---|---|---|---|---|---|---|---|---|
| Component A | PBN-1 | Parts by weight | 100 | 100 | 100 | 100 | 100 | 100 | 100 |
| | PBN-2 | | | | | | | | |
| | PBN-3 | | | | | | | | |
| | PBT-1 | | | | | | | | |
| Component B | B-1 | | 90 | 90 | 90 | 90 | 90 | 90 | 90 |
| | B-2 | | | | | | | | |
| | B-3 | | | | | | | | |
| | B-4 | | | | | | | | |
| | B-5 | | | | | | | | |
| | B-6 | | | | | | | | |
| | B-7 | | | | | | | | |
| | B-8 | | | | | | | | |
| | B-9 | | | | | | | | |
| | B-10 | | | | | | | | |
| | B-11 | | | | | | | | |
| | B-12 | | | | | | | | |
| | B-13 | | | | | | | | |
| | B-14 | | | | | | | | |
| Component C | C-1 | | 7 | 7 | 7 | 7 | 7 | 7 | 7 |
| | C-2 | | | | | | | | |

| | | | Unit | Ex. 10 | C.Ex. 20 | C.Ex. 21 | Ex. 11 | C.Ex. 22 | C.Ex. 23 | Ex. 12 |
|---|---|---|---|---|---|---|---|---|---|---|
| Component D | | D-1 | Parts by weight | 40 | 40 | 40 | 10 | 60 | 8 | 40 |
| | | D-2 | | | | | | | | |
| Component E | | E-1 | | 2 | 2 | 2 | 2 | 2 | 2 | 0.5 |
| | | E-2 | | | | | | | | |
| Component F | | F-1 | | 0.1 | 0.1 | 0.1 | 0.1 | 0.1 | 0.1 | 0.1 |
| Component G | | G-1 | | 0.1 | 0.1 | 0.1 | 0.1 | 0.1 | 0.1 | 0.1 |
| Characteristic properties of resin | Extrudability | Shoot-up | — | ○ | ○ | ○ | ○ | ○ | ○ | ○ |
| | | Torque-over | — | ○ | ○ | ○ | ○ | ○ | ○ | ○ |
| | Flexibility | Tensile elongation | % | 42 | 12 | 63 | 48 | 17 | 49 | 36 |
| | | Evaluation | — | ○ | X | ○ | ○ | X | ○ | ○ |
| | Heat deterioration resistance | Evaluation | — | ○ | ○ | X | ○ | ○ | ○ | ○ |
| | Abrasion resistance | Dynamic friction coefficient | — | 0.83 | 0.64 | 1.43 | 0.79 | 0.82 | 0.80 | 0.76 |
| | Insulation properties | Evaluation | — | ○ | ○ | ○ | ○ | ○ | ○ | ○ |
| | Low smoke-producing properties | Evaluation | — | ○ | ○ | ○ | ○ | ○ | X | ○ |
| Characteristic properties of wire | Heat deterioration resistance | Evaluation | — | ○ | Wire could not be produced | X | ○ | Wire could not be produced | ○ | ○ |
| | Abrasion resistance | Evaluation | — | ○ | | ○ | ○ | | ○ | ○ |

TABLE 5-continued

|  |  |  | Unit | C.Ex. 24 | Ex. 13 | C.Ex. 25 | C.Ex. 26 | Ex. 14 | C.Ex. 27 | C.Ex. 28 |
|---|---|---|---|---|---|---|---|---|---|---|
|  | Component D | D-1 | Parts by weight | 40 | 40 | 40 | 40 | 40 | 40 | 40 |
|  |  | D-2 |  |  |  |  |  |  |  |  |
|  | Component E | E-1 |  | 7 | 2 | 2 | 2 | 2 | 2 | 2 |
|  |  | E-2 |  |  |  |  |  |  |  |  |
|  | Component F | F-1 |  | 0.1 | 2 | 4 | 0.001 | 0.1 | 0.1 | 0.1 |
|  | Component G | G-1 |  | 0.1 | 0.1 | 0.1 | 0.1 | 2 | 4 | 0.001 |
| Characteristic properties of resin | Extrudability | Shoot-up | — | ○ | ○ | ○ | ○ | ○ | ○ | ○ |
|  |  | Torque-over | — | ○ | ○ | ○ | ○ | ○ | ○ | ○ |
|  | Flexibility | Tensile elongation | % | 14 | 24 | 13 | 27 | 26 | 15 | 28 |
|  |  | Evaluation | — | X | ○ | X | ○ | ○ | X | ○ |
|  | Heat deterioration resistance | Evaluation | — | ○ | ○ | X | X | ○ | ○ | X |
|  | Abrasion resistance | Dynamic friction coefficient | — | 0.75 | 0.81 | 0.84 | 0.77 | 0.79 | 0.80 | 0.78 |
|  | Insulation properties | Evaluation | — | ○ | ○ | ○ | ○ | ○ | ○ | ○ |
|  | Low smoke-producing properties | Evaluation | — | ○ | ○ | ○ | ○ | ○ | ○ | ○ |
| Characteristic properties of wire | Heat deterioration resistance | Evaluation | — | Wire could not be produced | ○ | Wire could not be produced | X | ○ | Wire could not be produced | X |
|  | Abrasion resistance | Evaluation | — |  | ○ |  | ○ | ○ |  | ○ |

Ex.: Example
C.Ex.: Comparative Example

In Tables 3 to 5, it is understood that Examples 1 to 14 in which a polycarbodiimide compound (component C) having a specific range of softening temperature was mixed with a thermoplastic polyester resin having a specific range of terminal carboxyl group concentration and a specific range of intrinsic viscosity (component A) are resin compositions for wire coating which exhibit excellent extrudability, heat deterioration resistance, abrasion resistance, flame retardancy and insulating properties, can achieve low smoke-producing properties and are industrially useful. Particularly the resin composition of Example 1 has excellent characteristic properties such as high abrasion resistance and high flexibility.

In Tables 3 to 5, since PBN having high intrinsic viscosity was used as component A in Comparative Example 1, torque-over occurred at the time of extrusion, thereby making it impossible to obtain a wire coating.

Since PBN having low intrinsic viscosity was used as component A in Comparative Example 2, the obtained resin composition was inferior in heat deterioration resistance and flexibility.

Since a thermoplastic polyester resin having a terminal carboxyl group concentration outside the range of the present invention was used as component A in Comparative Example 3, the obtained resin composition was inferior to that of Example 1 in heat deterioration resistance.

Since the amount of the polyester block copolymer was small in Comparative Example 4, the obtained resin composition was inferior in flexibility.

Since the amount of the polyester block copolymer was too large in Comparative Example 5, the obtained resin composition was inferior in abrasion resistance.

Since a monocarbodiimide compound having a softening temperature below the range of the present invention was used in Comparative Example 6, a shoot-up occurred at the time of extrusion and satisfactory extrusion was impossible.

Since magnesium hydroxide having a larger average particle diameter than the range of the present invention was used in Comparative Example 7, the obtained resin composition was inferior in insulating properties.

Since an inorganic porous filler having a larger average particle diameter than the range of the present invention was used in Comparative Example 8, the obtained resin composition was inferior in insulating properties.

It is understood from Comparative Examples 7 and 8 that insulation properties and abrasion resistance are improved by setting the particle diameter of magnesium hydroxide and the particle diameter of the inorganic porous filler to specific ranges.

Since the hindered phenol-based antioxidant (component F) and the phosphorus-based antioxidant (component G) were not used in Comparative Example 9, the obtained resin composition was inferior in heat deterioration resistance.

Since the content of the soft segment of the polyester block copolymer exceeded the range of the present invention in Comparative Example 10, the obtained resin composition was inferior in abrasion resistance.

Since the intrinsic viscosity of the polyester block copolymer was lower than the range of the present invention in Comparative Example 11, the obtained resin composition was inferior in flexibility and heat deterioration resistance.

Since the terminal carboxyl group concentration of the polyester block copolymer exceeded the range of the present invention in Comparative Example 12, the obtained resin composition was inferior in heat deterioration resistance.

Since the content of the aliphatic dicarboxylic acid component in the soft segment of the polyester block copolymer exceeded the range of the present invention in Comparative Example 13, the obtained resin composition was inferior in heat deterioration resistance.

Since the content of the aliphatic dicarboxylic acid in the soft segment of the polyester block copolymer was low in Comparative Example 14, the obtained resin composition was inferior in flexibility.

Since magnesium hydroxide (component D) was not used in Comparative Example 15, the obtained resin composition was greatly inferior in low smoke-producing properties.

Since the porous inorganic filler (component E) was not used in Comparative Example 16, the obtained resin composition was greatly inferior in insulating properties.

Since the intrinsic viscosity of the polyester block copolymer exceeded the range of the present invention in Comparative Example 17, the obtained resin composition was inferior in heat deterioration resistance.

Since the melting point of the polyester block copolymer exceeded the range of the present invention in Comparative Example 18, the obtained resin composition was inferior in heat deterioration resistance.

Since the content of the soft segment of the polyester block copolymer was lower than the range of the present invention in Comparative Example 19, the obtained resin composition was inferior in flexibility.

Since the amount of the polycarbodiimide compound exceeded the range of the present invention in Comparative Example 20, the obtained resin composition was inferior in flexibility.

Since the amount of the polycarbodiimide compound was smaller than the range of the present invention in Comparative Example 21, the obtained resin composition was inferior in heat deterioration resistance and abrasion resistance.

Since the amount of magnesium hydroxide exceeded the range of the present invention in Comparative Example 22, the obtained resin composition was inferior in flexibility.

Since the amount of magnesium hydroxide was smaller than the range of the present invention in Comparative Example 23, the obtained resin composition was greatly inferior in low smoke-producing properties.

Since the amount of the porous inorganic filler exceeded the range of the present invention in Comparative Example 24, the obtained resin composition was inferior in flexibility.

Since the amount of the hindered phenol-based antioxidant exceeded the range of the present invention in Comparative Example 25, the obtained resin composition was inferior in flexibility and heat deterioration resistance.

Since the amount of the hindered phenol-based antioxidant was smaller than the range of the present invention in Comparative Example 26, the obtained resin composition was inferior in heat deterioration resistance.

Since the amount of the phosphorus-based antioxidant exceeded the range of the present invention in Comparative Example 27, the obtained resin composition was inferior in flexibility and heat deterioration resistance.

Since the amount of the phosphorus-based antioxidant was smaller than the range of the present invention in Comparative Example 28, the obtained resin composition was inferior in heat deterioration resistance.

When an insulated wire was produced to evaluate its characteristic properties, Examples 1 to 14 having excellent resin characteristic properties had excellent insulated wire characteristic properties, and it is obvious that the industrial effect of the present invention is overwhelming. It was difficult to produce an insulated wire by using the resin composition of Comparative Example 1 which was inferior in extrudability and the resin compositions of Comparative Examples 4, 6, 11, 14, 19, 20, 22, 24, 25 and 27 which were inferior in flexibility. Since the resin compositions of Comparative Examples 2, 3, 5, 7-10, 12, 13, 15-18, 21, 23 and 26 were inferior in at least one of heat deterioration resistance, abrasion resistance, insulating properties and low smoke-producing properties out of resin characteristic properties, satisfactory insulated wire characteristic properties could not be obtained, and these Comparative Examples were unsatisfactory.

Effect Of The Invention

The resin composition of the present invention is excellent in extrudability, heat deterioration resistance, abrasion resistance, flame retardancy and insulating properties. The resin composition of the present invention can achieve low smoke-producing properties and contains no halogen compound. Therefore, the resin composition of the present invention is suitable for use as a resin for wire coating and has an extremely large effect.

The invention claimed is:
1. A resin composition for wire coating, comprising:
(A) 100 parts by weight of a thermoplastic polyester resin (component A) having a terminal carboxyl group concentration of not more than 20eq/ton and an intrinsic viscosity of 0.7 to 1.4 dl/g;
(B) 40 to 150 parts by weight of a polyester block copolymer (component B) obtained by carrying out a transesterification reaction between 50 to 90 wt % of a soft segment (component B-1) and 50 to 10 wt % of a hard segment (component B-2) and having an intrinsic viscosity of 0.6 to 1.1 dl/g and a melting point of 190 to 230° C.,
the component B-1 comprising equal mole of (i) an acid component and (ii) a diol component,
(i) the acid component consisting of 15 to 40 mol % of an aliphatic dicarboxylic acid component having 6 to 12 carbon atoms (component B-1-1) and 85 to 60 mol % of isophthalic acid (component B-1-2) and
(ii) the diol component consisting of an aliphatic $\alpha,\omega$-diol having 6 to 12carbon atoms (component B-1-3), and
The component B-2 comprising equal mole of (i') an acid component and (ii') a diol component,
(i') the acid component consisting of terephthalic acid (component B-2-1) and
(ii') the diol component consisting of an aliphatic $\alpha,\omega$-diol having 2 to 4carbon atoms (component B-2-2);
(C) 0.1 to 10 parts by weight of a polycarbodiimide compound having a softening temperature of 50° C. or higher (component C);
(D) 10 to 50 parts by weight of magnesium hydroxide having an average particle diameter of 0.1 to 2 μm (component D);
(E) 0.5 to 5 parts by weight of an inorganic porous filler having an average particle diameter of 0.1 to 1 μm (component E), wherein the component E is at least one selected from the group consisting of fired kaolin, zeolite, mesalite, anthracite, foamed perlite and activated carbon;
(F) 0.002 to 2.5 parts by weight of a hindered phenol-based antioxidant (component F); and
(G) 0.002 to 2.5 parts by weight of a phosphorus-based antioxidant (component G).
2. The resin composition according to claim 1, wherein the component D is surface treated with at least one surface treating agent selected from the group consisting of higher fatty acids, anionic surfactants, phosphoric acid esters, coupling agents and esters of a polyhydric alcohol and a fatty acid.
3. The resin composition according to claim 1, wherein the component A is at least one thermoplastic polyester resin selected from the group consisting of polybutylene naphthalene dicarboxylate resin (component A-1) and polybutylene terephthalate resin (component A-2).

4. The resin composition according to claim 3, wherein the component A contains not less than 50 wt % of polybutylene naphthalene dicarboxylate resin (component A-1).

5. An insulated wire comprising a conductor and an insulating material coated on the exterior surface of the conductor, wherein the insulating material is the resin composition of claim 1.

6. The insulated wire according to claim 5, wherein the thickness of the insulating material is 0.01 to 0.5 mm.

7. The insulated wire according to claim 5 which has a sheath layer on the surface of the insulating material.

8. Use of the resin composition of claim 1 for coating a wire.

9. A method of producing an insulated wire, comprising extruding the resin composition of claim 1 onto the exterior surface of a conductor.

10. The resin composition according to claim 2, wherein the component A is at least one thermoplastic polyester resin selected from the group consisting of polybutylene naphthalene dicarboxylate resin (component A-1) and polybutylene terephthalate resin (component A-2).

11. The resin composition according to claim 10, wherein the component A contains not less than 50 wt % of polybutylene naphthalene dicarboxylate resin (component A-1).

12. An insulated wire comprising a conductor and an insulating material coated on the exterior surface of the conductor, wherein the insulating material is the resin composition of claim 2.

13. An insulated wire comprising a conductor and an insulating material coated on the exterior surface of the conductor, wherein the insulating material is the resin composition of claim 3.

14. An insulated wire comprising a conductor and an insulating material coated on the exterior surface of the conductor, wherein the insulating material is the resin composition of claim 10.

15. An insulated wire comprising a conductor and an insulating material coated on the exterior surface of the conductor, wherein the insulating material is the resin composition of claim 4.

16. An insulated wire comprising a conductor and an insulating material coated on the exterior surface of the conductor, wherein the insulating material is the resin composition of claim 11.

17. The insulated wire according to claim 12, wherein the thickness of the insulating material is 0.01 to 0.5 mm.

18. The insulated wire according to claim 13, wherein the thickness of the insulating material is 0.01 to 0.5 mm.

19. The insulated wire according to claim 14, wherein the thickness of the insulating material is 0.01 to 0.5 mm.

20. The insulated wire according to claim 15, wherein the thickness of the insulating material is 0.01 to 0.5 mm.

* * * * *